US 11,795,987 B2
(12) United States Patent
Disantis

(10) Patent No.: US 11,795,987 B2
(45) Date of Patent: Oct. 24, 2023

(54) RIVETLESS NUT PLATE

(71) Applicant: Sky Climber Fasteners LLC, Delaware, OH (US)

(72) Inventor: Raymond Disantis, Willoughby Hills, OH (US)

(73) Assignee: BPC LG 2, LLC, Charlotte, NC (US)

( * ) Notice: Subject to any disclaimer, the term of this patent is extended or adjusted under 35 U.S.C. 154(b) by 280 days.

(21) Appl. No.: 17/379,488

(22) Filed: Jul. 19, 2021

(65) Prior Publication Data

US 2022/0018382 A1 Jan. 20, 2022

Related U.S. Application Data

(60) Provisional application No. 63/053,796, filed on Jul. 20, 2020.

(51) Int. Cl.
*F16B 37/04* (2006.01)

(52) U.S. Cl.
CPC ............ *F16B 37/044* (2013.01); *F16B 37/04* (2013.01)

(58) Field of Classification Search
CPC ...... F16B 37/04; F16B 37/041; F16B 37/044; F16B 37/045; F16B 37/048; F16B 37/06; Y10S 411/97
USPC .......................................... 411/103, 111–113
See application file for complete search history.

(56) References Cited

U.S. PATENT DOCUMENTS

| | | |
|---|---|---|
| 2,878,543 A | 3/1959 | Newcomer |
| 2,940,495 A | 6/1960 | Wing |
| 2,967,593 A | 1/1961 | Cushman |
| 3,019,865 A | 2/1962 | Rohe |
| 3,042,156 A | 7/1962 | Rohe |
| 3,078,002 A | 2/1963 | Rodgers, Jr. |
| 3,131,743 A * | 5/1964 | Hinkle ................. F16B 37/044 411/968 |
| 3,197,854 A | 8/1965 | Rohe |
| 3,241,591 A | 3/1966 | Rosan et al. |
| 3,285,311 A | 11/1966 | Vantine |
| 3,305,996 A | 2/1967 | Shapiro |
| 3,313,078 A | 4/1967 | Rohe |
| 3,339,609 A | 9/1967 | Cushman |
| 3,355,850 A | 12/1967 | Rohe |
| 3,384,142 A | 5/1968 | Phelan |
| 3,392,225 A | 7/1968 | Phelan |
| 3,434,262 A | 3/1969 | Lawrence |
| 3,443,473 A | 5/1969 | Tritt |

(Continued)

FOREIGN PATENT DOCUMENTS

| | | |
|---|---|---|
| DE | 102011002031 | 10/2012 |
| EP | 2852765 | 2/2016 |
| JP | 11051018 | 2/1999 |

OTHER PUBLICATIONS

PCT International Search Report and written opinion, Application No. PCT/US2021/042215; dated Oct. 20, 2021, 9 pages.

*Primary Examiner* — Roberta S Delisle

(74) *Attorney, Agent, or Firm* — DAWSEY CO., LPA; David J. Dawsey

(57) ABSTRACT

A rivetless nut plate for attachment to a panel via a panel bore, having a nut, a washer, and a cage that retains the nut and the washer. The nut plate has a nonactivated state and an activated state. In the activated state a portion of the cage is expanded to grip the panel bore, and the nut has split into two independent sections allowing one section to move throughout a constrained range of motion.

20 Claims, 14 Drawing Sheets

(56) References Cited

U.S. PATENT DOCUMENTS

| | | | |
|---|---|---|---|
| 3,451,181 A | 6/1969 | Neuschotz | |
| 3,455,201 A | 7/1969 | Ryder | |
| 3,504,723 A | 4/1970 | Cushman et al. | |
| 3,508,592 A | 4/1970 | Rosan, Sr. | |
| 3,526,072 A | 9/1970 | Campbell | |
| 3,579,942 A | 5/1971 | Cole | |
| 3,621,557 A | 11/1971 | Cushman et al. | |
| 3,662,805 A | 5/1972 | Sygnator | |
| 3,678,980 A | 7/1972 | Gutshall | |
| 3,695,324 A * | 10/1972 | Gulistan | B23P 11/00 411/111 |
| 3,716,092 A | 2/1973 | Serewicz | |
| 3,771,272 A | 11/1973 | Mihaly | |
| 3,884,006 A | 5/1975 | Dietlein | |
| 3,977,146 A | 8/1976 | Wiley | |
| 4,269,106 A | 5/1981 | Leibhard | |
| 4,296,586 A | 10/1981 | Heurteux | |
| 4,405,272 A | 9/1983 | Wollar | |
| 4,428,705 A | 1/1984 | Gelhard | |
| 4,717,612 A | 1/1988 | Shackelford | |
| 4,729,705 A | 3/1988 | Higgins | |
| 4,846,612 A | 7/1989 | Worthing | |
| 4,981,735 A | 1/1991 | Rickson | |
| 4,984,947 A | 1/1991 | Flauraud | |
| 5,093,957 A | 3/1992 | Do | |
| 5,147,167 A | 9/1992 | Berecz | |
| 5,240,543 A | 8/1993 | Fetterhoff et al. | |
| 5,259,689 A | 11/1993 | Arand | |
| 5,542,777 A | 8/1996 | Johnson | |
| 5,730,540 A | 3/1998 | Duran et al. | |
| 5,971,686 A * | 10/1999 | Stewart | F16B 37/062 411/181 |
| 6,055,790 A | 5/2000 | Lunde et al. | |
| 6,264,412 B1 | 7/2001 | Nakamura et al. | |
| 6,298,633 B1 | 10/2001 | McCorkle et al. | |
| 6,309,158 B1 | 10/2001 | Bellinghausen | |
| 6,394,722 B1 | 5/2002 | Kunt | |
| 6,488,460 B1 | 12/2002 | Smith et al. | |
| 7,195,436 B1 | 3/2007 | Stephen | |
| 7,544,028 B2 * | 6/2009 | Tournier | F16B 37/046 411/128 |
| 7,891,151 B2 | 2/2011 | Sano | |
| 8,075,234 B2 | 12/2011 | McClure | |
| 8,393,124 B2 | 3/2013 | Zimmer | |
| 8,393,601 B2 | 3/2013 | de Mola | |
| 8,434,983 B2 | 5/2013 | Chen | |
| 8,640,428 B2 | 2/2014 | Naik et al. | |
| 8,763,753 B2 | 7/2014 | Kray | |
| 8,876,450 B1 | 11/2014 | Campau | |
| 8,950,159 B2 | 2/2015 | Cove et al. | |
| 9,114,449 B2 | 8/2015 | Ross et al. | |
| 9,175,474 B2 | 11/2015 | May et al. | |
| 9,409,395 B2 | 8/2016 | Wu | |
| 9,441,660 B2 | 9/2016 | Meyers | |
| 9,446,488 B2 | 9/2016 | Coronado | |
| 9,457,540 B2 | 10/2016 | Lewis et al. | |
| 9,611,877 B1 | 4/2017 | Attanasio | |
| 9,682,529 B2 | 6/2017 | Schoke et al. | |
| 9,803,668 B2 | 10/2017 | Reeves | |
| 9,822,808 B2 | 11/2017 | Rajeev | |
| 9,874,306 B2 | 1/2018 | Burkhard | |
| 9,975,309 B2 | 5/2018 | Patel et al. | |
| 9,976,583 B2 | 5/2018 | Lopez et al. | |
| 9,981,446 B2 | 5/2018 | Holemans | |
| 10,016,955 B2 | 7/2018 | Mills | |
| 10,018,209 B2 | 7/2018 | Burd et al. | |
| 10,092,986 B2 | 10/2018 | Coronado et al. | |
| 10,099,767 B2 | 10/2018 | Lewis et al. | |
| 10,197,078 B2 | 2/2019 | Richardson et al. | |
| 10,228,003 B2 | 3/2019 | Nipper et al. | |
| 10,228,684 B2 | 3/2019 | Coon et al. | |
| 10,309,434 B2 | 6/2019 | Kleshchev et al. | |
| 10,400,804 B2 | 9/2019 | Cheynet De Beaupre et al. | |
| 10,487,864 B2 | 11/2019 | Schmidt et al. | |
| 10,514,053 B2 | 12/2019 | Holzinger et al. | |
| 10,730,604 B2 | 8/2020 | Reeves et al. | |
| 2005/0025606 A1 * | 2/2005 | Toosky | B23P 9/025 411/181 |
| 2005/0155305 A1 | 7/2005 | Cosenza et al. | |
| 2005/0169726 A1 | 8/2005 | McClure | |
| 2008/0101887 A1 | 5/2008 | Toosky et al. | |
| 2009/0028660 A1 * | 1/2009 | Csik | F16B 5/0208 411/103 |
| 2015/0345536 A1 * | 12/2015 | Schraer | F16B 31/04 411/111 |

* cited by examiner

RIVETLESS NUT PLATE

CROSS-REFERENCE TO RELATED APPLICATIONS

This application claims the benefit of U.S. provisional patent application Ser. No. 63/053,796, filed on Jul. 20, 2020, all of which are incorporated by reference as if completely written herein.

STATEMENT REGARDING FEDERALLY SPONSORED RESEARCH OR DEVELOPMENT

Not applicable.

TECHNICAL FIELD OF THE INVENTION

The present invention relates generally to rivetless nut plates.

BACKGROUND OF THE INVENTION

A plate nut, also known as a nut plate, anchor nut or anchor plate, is a stamped sheet metal nut that is usually riveted or glued to a workpiece. Floating nut plates are generally low profile and lightweight plates used to install a captive nut behind a panel. The floating nut allows for an assembly that is not perfectly aligned. The field has needed a nut plate that eliminates the need for rivets and adhesives. A rivetless nut plate eliminates the need for additional rivet holes, as well as reaming, counterboring, and countersinking steps.

SUMMARY OF THE INVENTION

A rivetless nut plate for attachment to a panel via a panel bore, having a nut, a washer, and a cage that retains the nut and the washer. The nut plate has a nonactivated state and an activated state. In the activated state a portion of the cage is expanded to grip the panel bore, and the nut has split into two independent sections allowing one section to move throughout a constrained range of motion.

BRIEF DESCRIPTION OF THE DRAWINGS

Without limiting the scope of the present invention as claimed below and referring now to the drawings and figures:

Figure 1A:
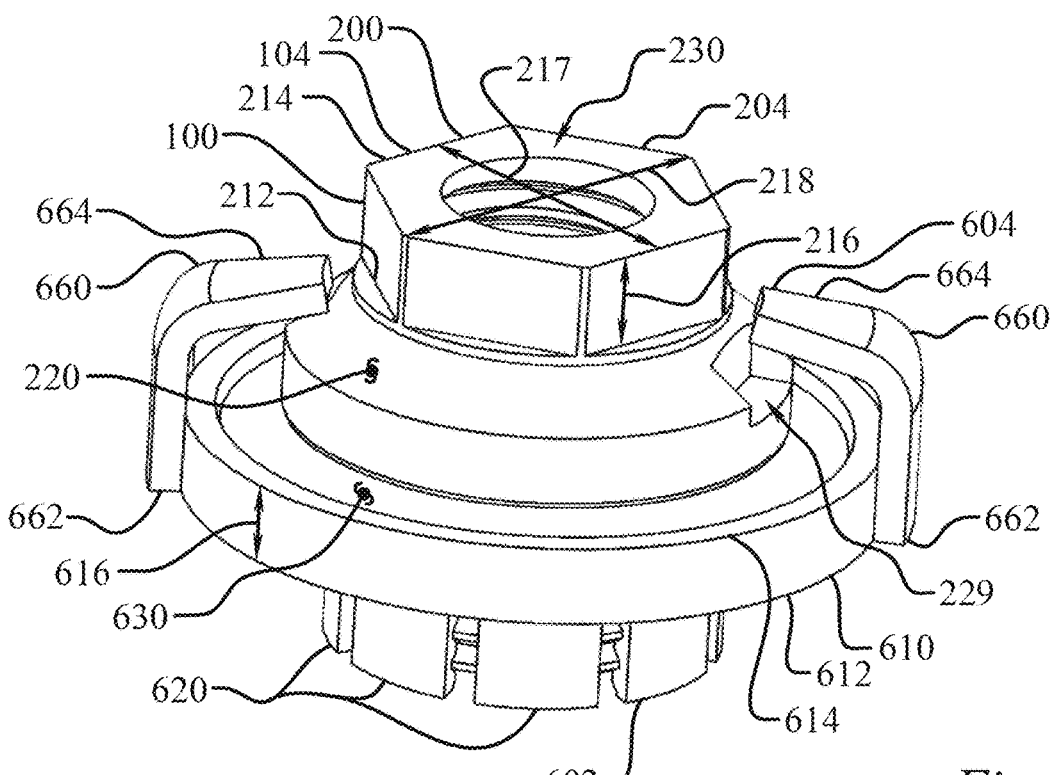
FIG. 1A is an isometric view of an embodiment of a rivetless nut plate.

These illustrations are provided to assist in the understanding of the exemplary embodiments of rivetless nut plates as described in more detail below and should not be construed as unduly limiting the specification. In particular, the relative spacing, positioning, sizing, and dimensions of the various elements illustrated in the drawings may not be drawn to scale and may have been exaggerated, reduced, or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

Figure 1B:
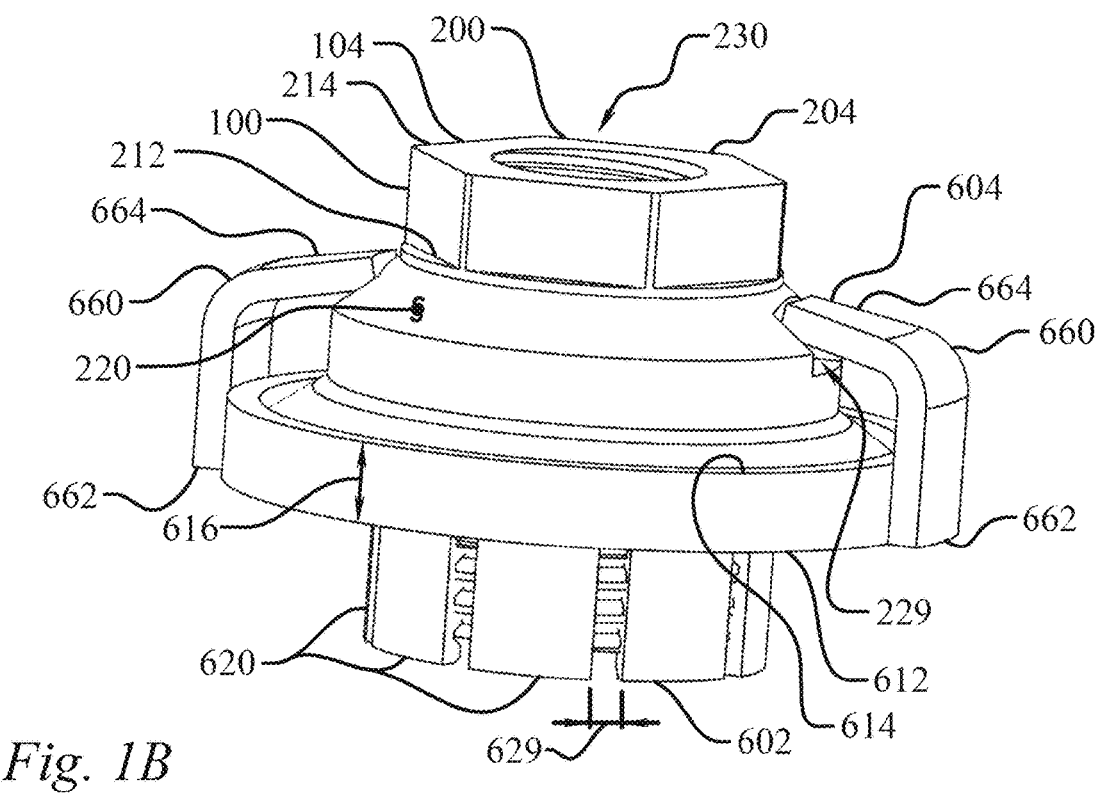
FIG. 1B is another isometric view of an embodiment of a rivetless nut plate.
Figure 10:
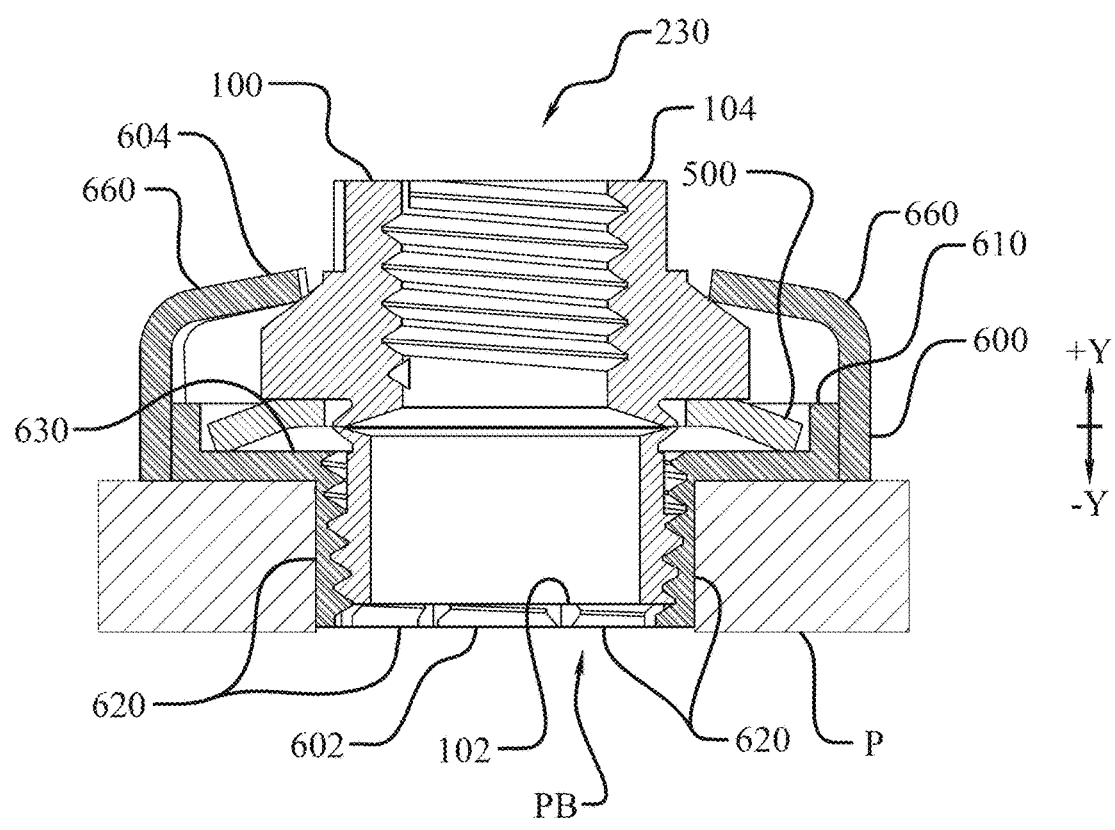
FIG. 10 is a cross-section view of an embodiment of a non-engage rivetless nut plate taken along section line 10-10 in FIG. 9.
Figure 11:
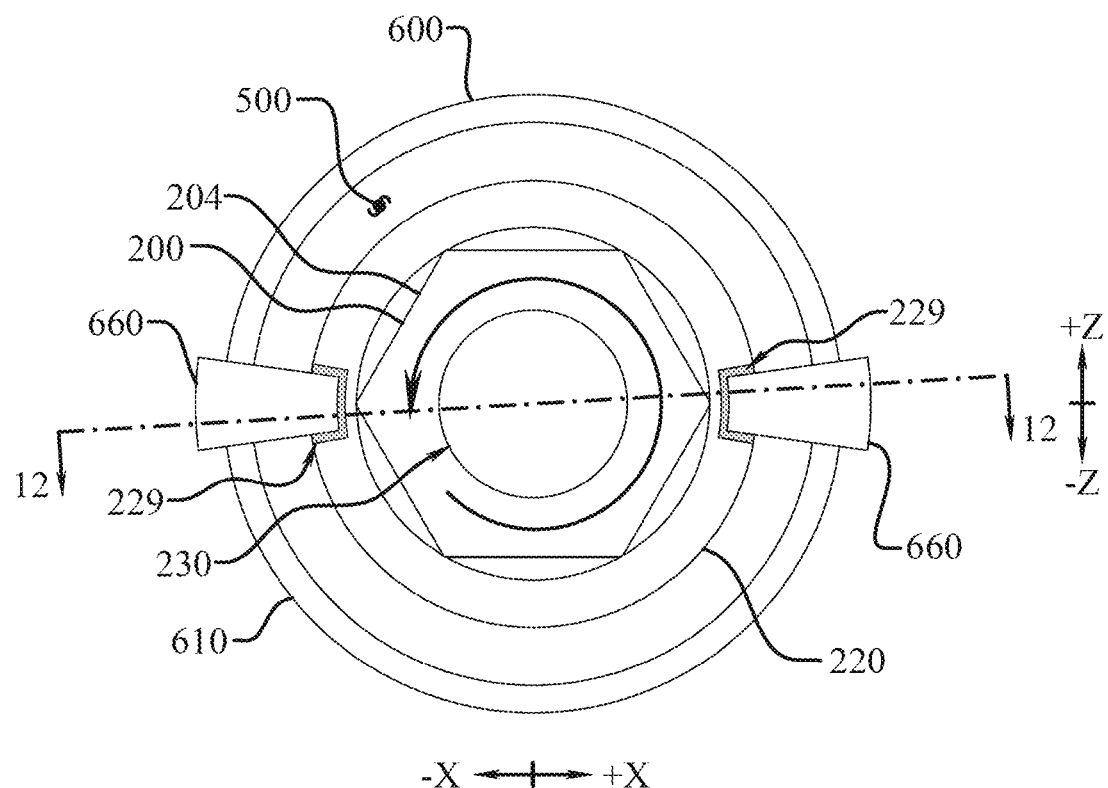
FIG. 11 is a top plan view of an embodiment of a rivetless nut plate in an installed engaged state.
Figure 12:
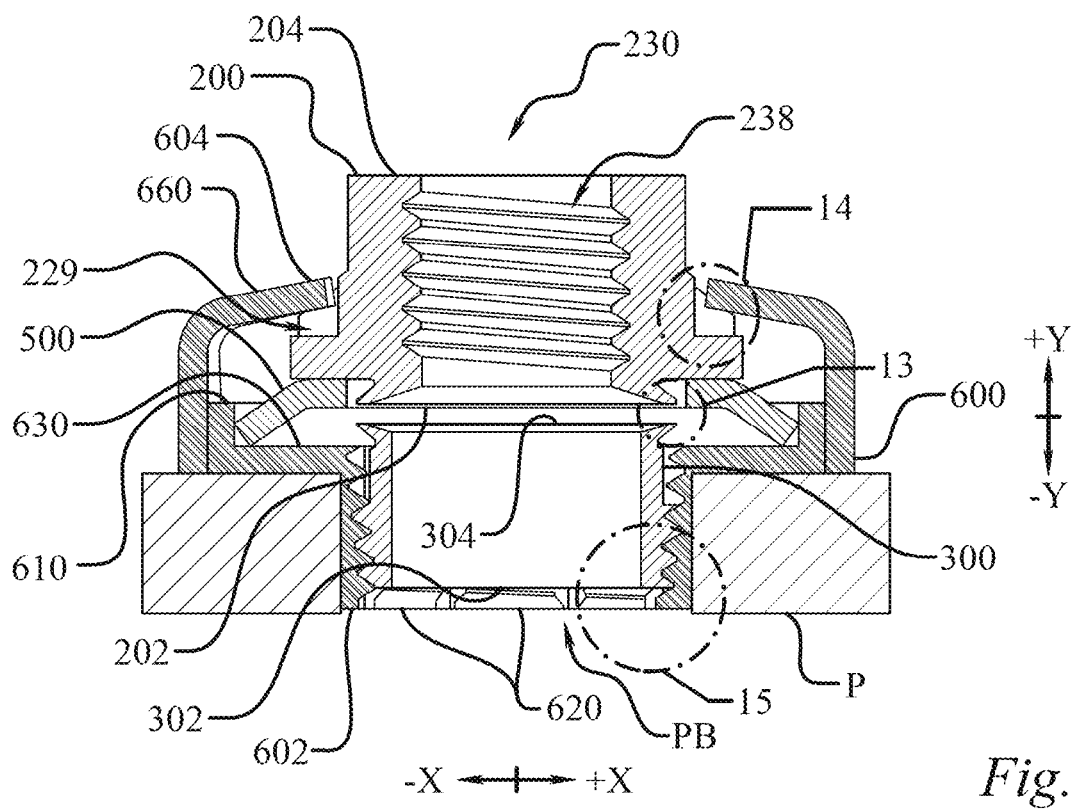
FIG. 12 is a cross-section view of an embodiment of an installed engaged rivetless nut plate taken along section line 12-12 in FIG. 11.

A plate nut, also known as a nut plate, anchor nut, or anchor plate, is generally a stamped sheet metal nut that is usually riveted or glued onto a workpiece. Floating nut plates are generally low profile and lightweight plates used to install a captive nut behind a panel. The floating nut allows for an assembly that is not perfectly aligned. The current invention allows a nut plate to be securely affixed to a panel (P) while eliminating the need of rivets, and the associated steps of reaming, counterboring, and countersinking, or various adhesives. As seen in FIGS. 1-6, various embodiments of a rivetless nut plate may include a nut (100), seen best in FIGS. 2 and 4C, a washer (500), seen best in FIGS. 6, 10, and 12, and a cage (600), seen best in FIGS. 3 and 6. As seen in FIGS. 10 and 12, the rivetless nut plate is designed to be at least partially inserted in a panel bore (PB) located in a panel (P), and securely locked in place by rotating the nut (100) in relation to the cage (600) with a tool. Rotating the nut (100), in relation to the cage (600), causes the inserted portion on the rivetless nut plate to expand against the walls of the panel bore (PB), thereby frictionally securing the rivetless nut plate in place. The rivetless nut plate is designed to work on curved panels as well as flat panels, but flat panels are illustrated for simplicity. FIGS. 1A and 1B show the rivetless nut plate in an assembled state. Furthermore, FIG. 1A shows the rivetless nut plate with the nut (100) in an non-engaged state, in other words—not rotated into an activated state, whereas FIG. 1B illustrated the rivetless nut plate having a nut (100) rotated into an activated state. The functioning and goals of the various components of the nut plate will be described in detail after the basic structure of nut plate embodiments is disclosed in detail.

Figure 7:
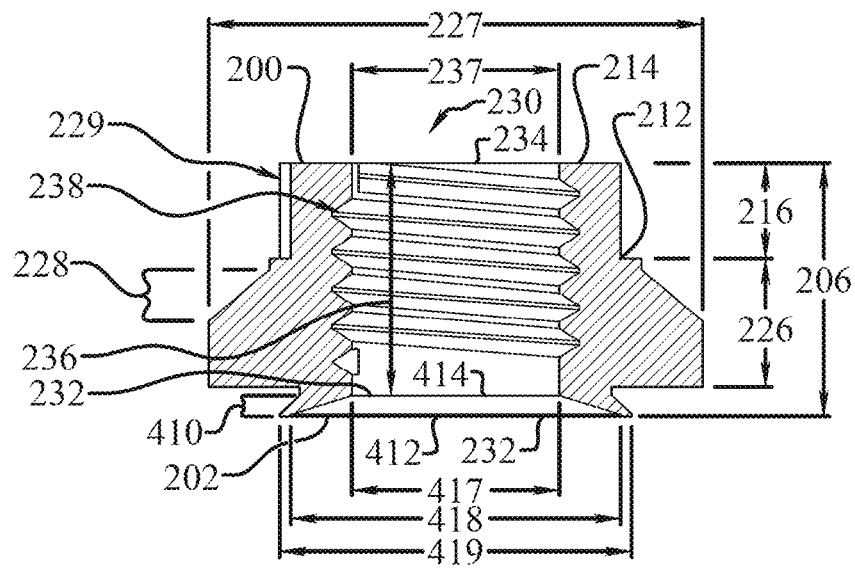
FIG. 7 is a cross-section view of an embodiment of a main nut section (MNS)

Now referring to FIGS. 2, 4A-4C, 7 and 8, the nut (100) has a nut distal end (102), a nut proximal end (104), and a nut length (106) between the nut distal end (102) and the nut proximal end (104). The nut (100) may further include a main nut section (200), abbreviated MNS, a nut axial protrusion section (300), abbreviated NAPS, and a nut frangible section (400). The main nut section (200) may have a MNS distal end (202), a MNS proximal end (204), and a MNS length (206) between the MNS distal end (202) and the MNS proximal end (204), as seen in FIG. 7. Unless stated otherwise, the nut frangible section (400) separates the main nut section (200) from the nut axial protrusion section (300), and more specifically it is the point of the MNS frangible portion (410) designed to separate, shear, or break, which in the illustrated embodiment is the location with the thinnest wall section, but may be incorporate other engineered fracture point promoting methods. Further, in one embodiment the main nut section (200) may have a tool engagement portion (210) allowing the nut (100) to be rotationally activated by a tool, a MNS flange (220), and a MNS bore (230), illustrated in FIGS. 1A-2.

Figure 2:
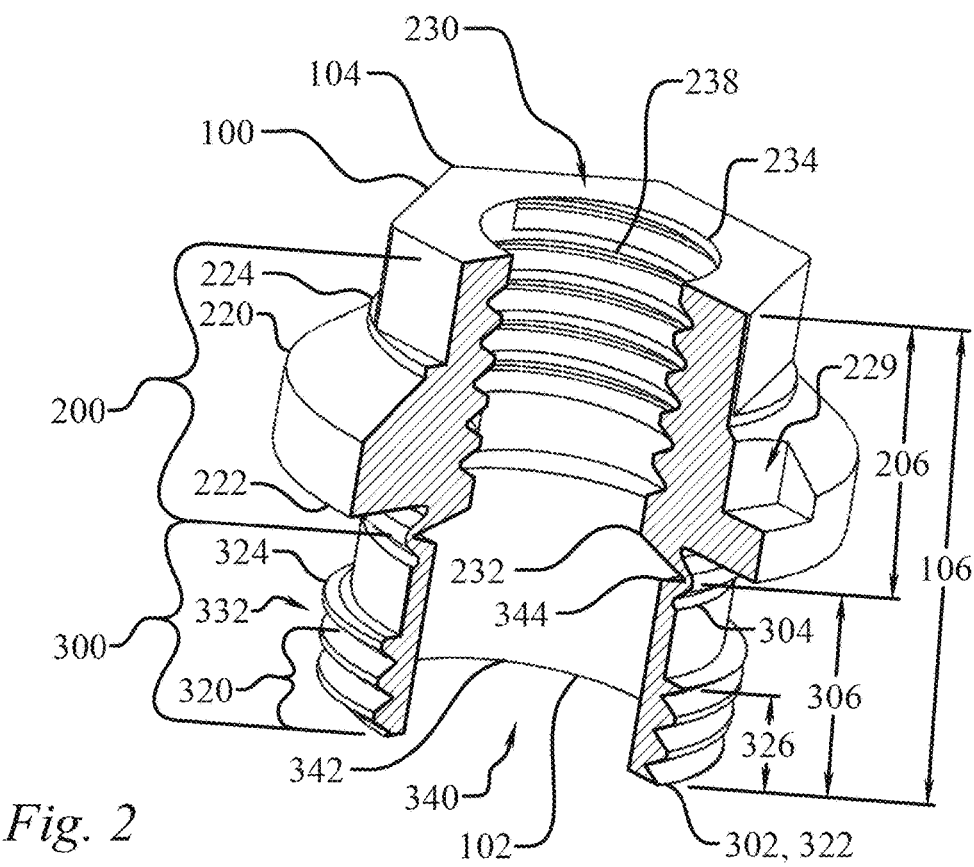
FIG. 2 is a cutaway isometric view of an embodiment of a nut.
Figure 4A:
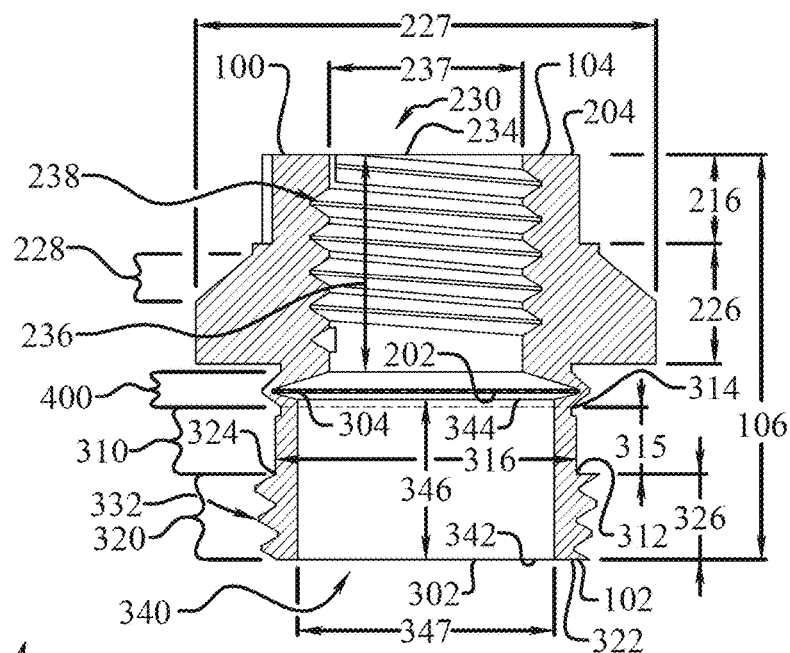
FIG. 4A is a cross-section view of an embodiment of a nut.

In one embodiment the tool engagement portion (210) may have an external tool engagement surface such as the illustrated hex-head style shape, however it may be any shape to cooperate with common tools or a tool specific to a manufacturer, which may include bosses, recesses, and/or channels that cooperate with a tool in addition to, or in lieu of, flat external tool engagement surfaces. As seen in FIGS. 1A, 2, and 4A, the tool engagement portion (210) may have a tool engagement portion distal end (212), a tool engagement portion proximal end (214), a tool engagement portion length (216) between the tool engagement portion distal end (212) and the tool engagement portion proximal end (214), a tool engagement portion minimal width (217) and a tool engagement portion maximum width (218).

Further, in one embodiment the tool engagement portion proximal end (214) may also be the nut proximal end (104) and MNS proximal end (204), in another embodiment the tool engagement portion proximal end (214) may be located at a distance lower than the nut proximal end (104) and MNS proximal end (204) shifted towards the MNS distal end (202). Additionally, the previous mentioned tool engagement portion length (216) may be less than or equal to the tool engagement portion minimal width (217), whereas in another embodiment the tool engagement portion length (216) may be up to two times larger than the tool engagement portion minimal width (217). Furthermore, in another embodiment the tool engagement portion (210) may have a square, round, or other shape with the tool engagement portion minimal width (217) equal to the tool engagement portion maximum width (218), in yet another embodiment the tool engagement portion (210) may have a tool engagement portion minimal width (217) that is at least 20% less than the tool engagement portion maximum width (218), and at least 30% less in another embodiment, and at least 40% less in still a further embodiment.

In yet another embodiment the tool engagement portion (210) may be recess within the MNS proximal end (204) forming a receiving recess for an activating tool. The tool engagement portion distal end (212) may also be the MNS flange proximal end (224) in one embodiment as seen in FIGS. 1A and 2, while in yet another embodiment having a tool engagement portion (210) recess the tool engagement portion distal end (212) may be located within the main nut section (200). The earlier mentioned MNS flange (220) may have a MNS flange distal end (222), a MNS flange proximal end (224), as seen in FIG. 2, a MNS flange length (226) between the MNS flange distal end (222) and the MNS flange proximal end (224), as seen in FIG. 4A, a MNS flange width (227), a MNS flange tapered region (228), and a MNS flange nut locking prong receiving recess (229), seen best in FIGS. 2 and 12. The main nut section (200) need not have a discreet tool engagement portion (210) and MNS flange (220), as depending on the type of tool the MNS flange (220) may extend all the way to the nut proximal end (104) with a constant geometry or one that varies. For instance, the MNS flange (220) seen in FIG. 2 may have a constant diameter all the way to the nut proximal end (104) provided it has engagement features to cooperate with a tool.

In one embodiment a delicate balance of weight, stress distribution, tool engagement, and installation/activation simplicity has been achieved via the incorporation of a MNS flange (220) with a MNS flange tapered region (228), which in one embodiment has a taper angle of 10-80 degrees, and 20-70 degrees in another embodiment, and 30-60 degrees in still a further embodiment. In one embodiment the MNS flange tapered region (228) is confined to no more than 65% of the MNS length (206), and no more than 50% in another embodiment, and no more than 40% in still a further embodiment. In another embodiment the MNS flange tapered region (228) starts at the MNS flange proximal end (224) and transitions all the way to the MNS flange distal end (222), in still another embodiment the MNS flange tapered region (228) starts at the MNS flange proximal end (224) and transitions over not more than 50% of the distance to the MNS flange distal end (222). Additionally, in a further embodiment the MNS flange length (226), seen in FIG. 4A, is at least 10% of the MNS flange width (227), while in another embodiment the MNS flange length (226) is no more than 50% of the MNS flange width (227), and 15-40% in still a further embodiment.

The previous mentioned MNS bore (230) may have a MNS bore distal end (232), a MNS bore proximal end (234), which may correspond with the nut proximal end (104), a MNS bore length (236) located between the MNS bore distal end (232) and the MNS bore proximal end (234), a MNS bore width (237) that may have MNS bore threads (238), as illustrated in FIGS. 2 and 7. The MNS bore threads (238) releasably engages a separate screw or bolt, not shown, to secure another panel (P) or component to the rivetless nut plate. Additionally, in one embodiment the MNS bore length (236) may be at least 20% of the MNS flange width (227), and at least 30% in another embodiment, and 30-75% in still a further embodiment. Furthermore, in one embodiment the MNS bore width (237) is at least 30% of the MNS bore length (236), at least 40% and 50% in further embodiments, and no more than 90%, 80%, and 70% in still additional embodiments.

Figure 8:
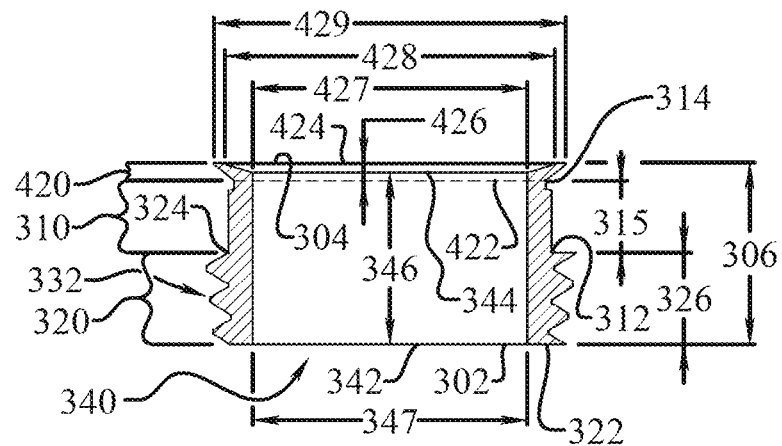
FIG. 8 is a cross-section view of an embodiment of a nut axial protrusion section (NAPS)

Now referring to FIGS. 2, 4A-4C, and 8, the earlier mentioned nut axial protrusion section (300), abbreviated NAPS, may have a NAPS distal end (302), a NAPS proximal end (304), and a NAPS length (306) between the NAPS distal end (302) and the NAPS proximal end (304), seen best in FIG. 8. In addition, the nut axial protrusion section (300) may further have a NAPS body portion (310), a NAPS threaded portion (320), and a NAPS bore (340). The NAPS body portion (310) may further include a NAPS body portion distal end (312), a NAPS body portion proximal end (314), a NAPS body portion length (315) located between the NAPS body portion distal end (312) and the NAPS body portion proximal end (314), which may correspond to the NAPS proximal end (304), and a NAPS body portion width (316), seen in FIG. 4A. As seen in FIG. 8, the NAPS threaded portion (320) may further include a NAPS threaded portion distal end (322), which may correspond to the NAPS distal end (302), a NAPS threaded portion proximal end (324) that abuts the NAPS body portion distal end (312), a NAPS threaded portion length (326) located between the NAPS threaded portion distal end (322) and the NAPS threaded portion proximal end (324), a NAPS threaded portion minimum width (328), seen in FIG. 4B, a NAPS threaded portion maximum width (329), a NAPS threaded portion taper angle (330), and a plurality of NAPS threaded portion threads (332).

The NAPS threaded portion (320) may extend over the entire NAPS length (306), or just a portion of it, in which case a NAPS body portion (310) exists. As seen in FIGS. 10 and 12, the NAPS threaded portion (320) generally does not need to extend over the entire NAPS length (306), however the NAPS threaded portion length (326) should be at least 20% of the NAPS length (306), and at least 30% in another embodiment, and at least 40% in still a further embodiment. However, when a NAPS body portion (310) exists, the NAPS threaded portion length (326) is preferably at least 70% of the NAPS body portion length (315), and at least 90% in another embodiment, and at least 100% in still a further embodiment. Alternatively, in another embodiment the NAPS body portion length (315) is no more than the NAPS threaded portion length (326), and is 50-95% of the NAPS threaded portion length (326) in another embodiment, and 60-85% in still another embodiment. Furthermore, in one embodiment the NAPS body portion width (316), seen in FIG. 4A, is at least 70% of the NAPS threaded portion minimum width (328), and at least 80% in another embodiment, and at least 85% in still a further embodiment. Additionally, in another embodiment the NAPS body portion width (316) may be 60-8% of the NAPS threaded portion maximum width (329), in another embodiment the NAPS body portion width (316) may be 65-75% of the NAPS threaded portion maximum width (329), while in yet a further embodiment the NAPS body portion width (316) is less than 70 percent of the NAPS threaded portion maximum width (329).

The previous mentioned NAPS bore (340) may include a NAPS bore distal end (342), which is also the NAPS distal end (302), a NAPS bore proximal end (344), seen in FIGS. 4A and 8, located between the NAPS proximal end (304) and a NAPS frangible portion distal end (422), a NAPS bore length (346) between the NAPS bore distal end (342) and the NAPS bore proximal end (344), and a NAPS bore width (347). In one embodiment the NAPS bore width (347) is 50 to 100 percent of the MNS bore width (237), in another embodiment the NAPS bore width (347) is 60 to 80 percent of the MNS bore width (237), in yet another embodiment NAPS bore width (347) is less than 75 percent of the MNS bore width (237). Further, in one embodiment the NAPS bore length (346) is 50 to 100 percent of the MNS bore length (236), while in another embodiment the NAPS bore length (346) is 60 to 80 percent of the MNS bore length (236), in still yet another embodiment the NAPS bore length (346) is less than 75 percent of the MNS bore length (236).

Figure 4B:
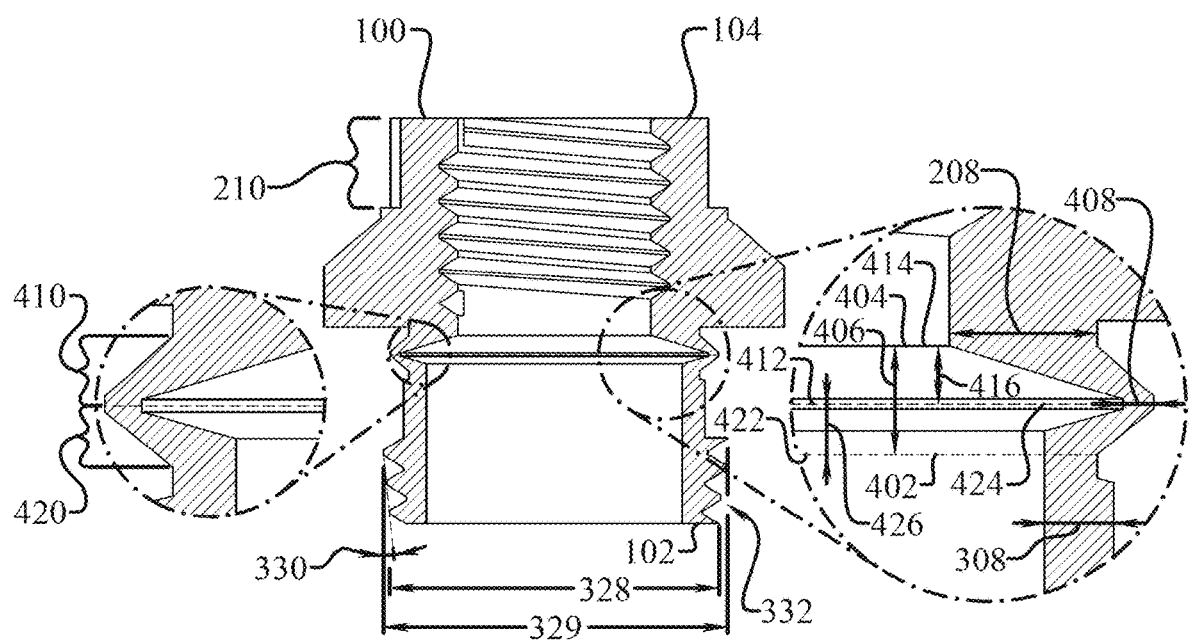
FIG. 4B is another cross-section view of an embodiment of a nut having two magnified regions.

Referring now to FIGS. 2, 4A, and 4B, which show an embodiment of a nut (100) having a uniform non-split body, the nut (100) has a main nut section (200), having a MNS length (206), and a nut axial protrusion section (300), having a NAPS length (306), the sum of which is equal to the nut length (106). The point of delineation is location designed to separate, shear, or break, which in the illustrated embodiment is the location with the thinnest wall section, but may be incorporate other engineered fracture point promoting methods. In one embodiment the NAPS length (306) is less than the MNS length (206), while in another embodiment the NAPS length (306) is at least 10% less than the MNS length (206), and at least 20% less in still a further embodiment. However, as with all of the disclosed relationships, the delicate balance and tradeoffs involve more than merely minimizing or maximizing a value, rather embodiments with closed ended ranges recognize points of diminishing returns and avoid negative consequences affecting durability, ease of use, strength, stress, fatigue and vibration resistance, and weight. In one such embodiment the NAPS length (306) is 60-95% of the MNS length (206), in another embodiment the NAPS length (306) is 65-90% of the MNS length (206), and in yet another embodiment the NAPS length (306) is 70-85% of the MNS length (206). Additionally, in one embodiment NAPS threaded portion length (326) may be 30 to 75% of the NAPS length (306), while in another embodiment the NAPS threaded portion length (326) may be 40 to 60% of the NAPS length (306), while in yet another embodiment the NAPS threaded portion length (326) may be 50 to 55% of the NAPS length (306), while in still yet another embodiment the NAPS threaded portion length (326) is less than 60% of the NAPS length (306).

Now referring to FIGS. 4A-4C, 7 and 8, the nut (100) may include an earlier mentioned nut frangible section (400) that may have a nut frangible section distal end (402), a nut frangible section proximal end (404), and a nut frangible section length (406) between the nut frangible section distal end (402) and the nut frangible section proximal end (404), best seen in FIG. 4B. The nut frangible section (400) may further include a MNS frangible portion (410), and a NAPS frangible portion (420), regions that transition to the point of engineered fracture. The MNS frangible portion (410) may further include a MNS frangible portion distal end (412), a MNS frangible portion proximal end (414), a MNS frangible portion length (416) between the MNS frangible portion distal end (412) and the MNS frangible portion proximal end (414), a MNS frangible portion inner diameter (417), a MNS frangible portion minimum outer width (418), and a MNS frangible portion maximum outer width (419), seen best in FIG. 7. The previous mentioned NAPS frangible portion (420) may further include a NAPS frangible portion distal end (422), a NAPS frangible portion proximal end (424), a NAPS frangible portion length (426) between the NAPS frangible portion distal end (422) and the NAPS frangible portion proximal end (424), a NAPS frangible portion inner width (427), a NAPS frangible portion minimum outer width (428), and a NAPS frangible portion maximum outer width (429), seen best in FIG. 4C. The earlier disclosed nut frangible section length (406) is equal to the sum of the MNS frangible portion length (416) and the NAPS frangible portion length (426), as seen in FIG. 4B. In an embodiment the nut frangible section (400) begins at the end of the MNS bore (230), which is the MNS bore distal end (232) and coincides with the nut frangible section proximal end (404) and MNS frangible portion proximal end (414). In this embodiment the opposite end of the nut frangible section (400), or the nut frangible section distal end (402) and NAPS frangible portion distal end (422), is established by the point at which the exterior surface of the nut (100) returns to being parallel to its longitudinal axis. In one embodiment the nut frangible section length (406) is less than the MNS length (206) and the NAPS length (306), while in further embodiment the nut frangible section length (406) is at least 25% less than one of the MNS length (206) and the NAPS length (306), and at least 25% less than both of the MNS length (206) and the NAPS length (306) in another embodiment. The nut frangible section length (406) is at least 10% of the NAPS length (306) in an embodiment, and at least 20% and at least 25% in additional embodiments; however, the nut frangible section length (406) is no more than 70% of the NAPS length (306) in an embodiment, and no more than 60% and 50% in additional embodiments. The nut frangible section length (406) is at least 10% of the MNS length (206) in an embodiment, and at least 15% and at least 20% in additional embodiments; however, the nut frangible section length (406) is no more than 60% of the NAPS length (306) in an embodiment, and no more than 50% and 40% in additional embodiments.

Figure 4C:
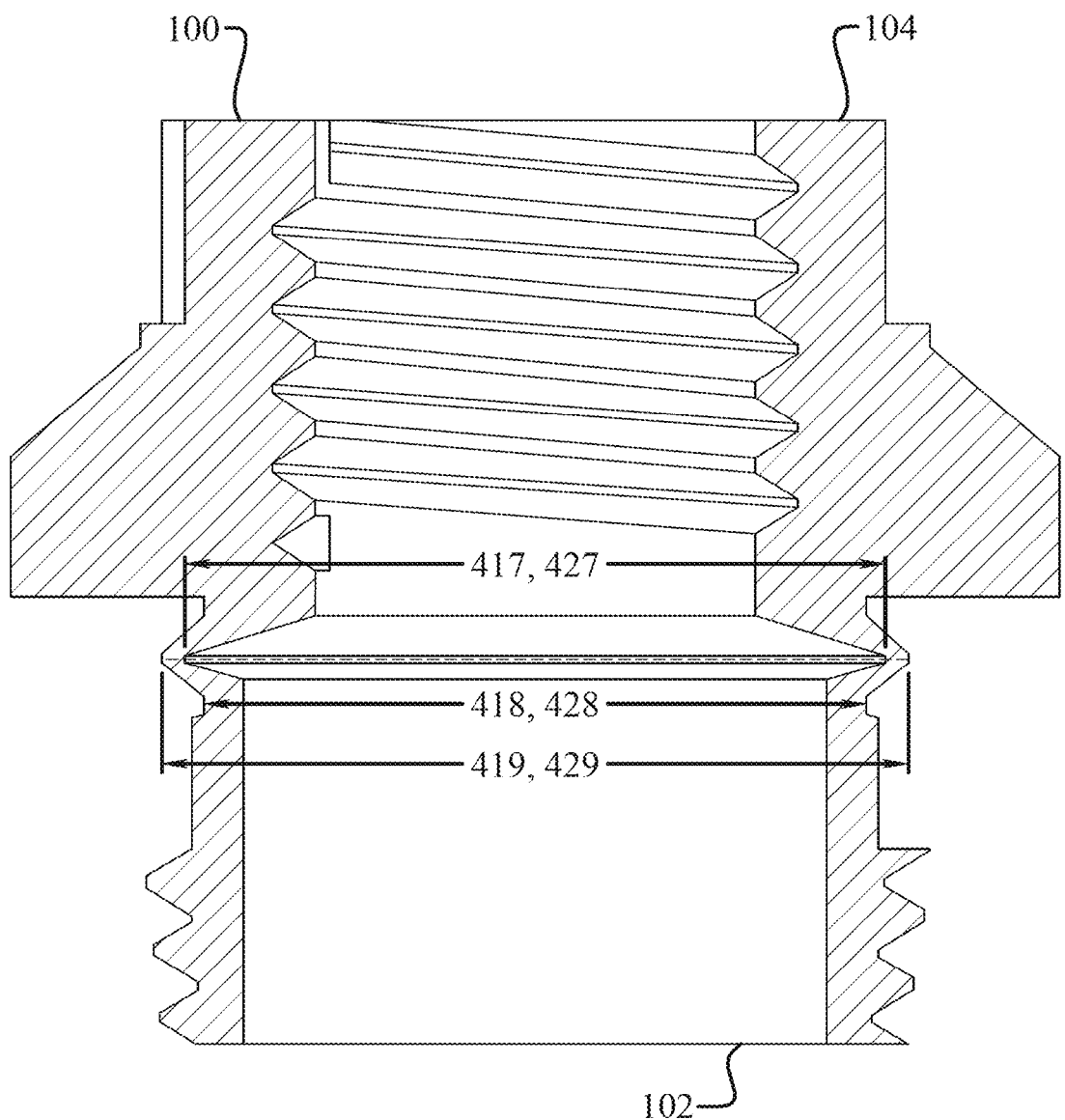
FIG. 4C is another cross-section view of an embodiment of a nut.

In one embodiment seen in FIG. 4C, the MNS frangible portion inner diameter (417) may greater than the MNS frangible portion minimum outer width (418), and at least 1% greater, 3% greater, and 5% greater in additional embodiments. Additionally, in one embodiment the MNS frangible portion maximum outer width (419) may be 70-140% of the MNS frangible portion minimum outer width (418), while in another embodiment the MNS frangible portion maximum outer width (419) may be 90-120% of the MNS frangible portion minimum outer width (418), in yet another embodiment the MNS frangible portion maximum outer width (419) is at least 2 percent larger than the MNS frangible portion minimum outer width (418). Furthermore, in one embodiment the MNS frangible portion length (416) may be 4 to 11 percent of the MNS frangible portion minimum outer width (418), in another embodiment the MNS frangible portion length (416) may be 5 to 9 percent of the MNS frangible portion minimum outer width (418), in yet another embodiment the MNS frangible portion length (416) is at less than 8 percent of the MNS frangible portion minimum outer width (418). Furthermore the NAPS frangible portion proximal end (424) may also be located at the NAPS proximal end (304), and the nut frangible section distal end (402) along with the NAPS frangible portion distal end (422) may be located at the NAPS bore proximal end (344) as seen in FIG. 8. In another embodiment, the NAPS frangible portion inner width (427) may be greater than the NAPS frangible portion minimum outer width (428), and at least 1% greater, 3% greater, and 5% greater in additional embodiments. Additionally, in one embodiment the NAPS frangible portion maximum outer width (429) may be 70-140% of the NAPS frangible portion minimum outer width (428), while in another embodiment the NAPS frangible portion maximum outer width (429) may be 90-120% of the NAPS frangible portion minimum outer width (428), in yet another embodiment the NAPS frangible portion maximum outer width (429) is at least 2 percent larger than the NAPS frangible portion minimum outer width (428). Furthermore, in one embodiment the NAPS frangible portion length (426) may be 4 to 11 percent of the NAPS frangible portion minimum outer width (428), in another embodiment the NAPS frangible portion length (426) may be 5 to 9 percent of the NAPS frangible portion minimum outer width (428), in yet another embodiment the NAPS frangible portion length (426) is at less than 8 percent of the NAPS frangible portion minimum outer width (428). In the embodiment of FIG. 4C the MNS frangible portion inner diameter (417) is equal to the NAPS frangible portion inner width (427), the MNS frangible portion minimum outer width (418) is equal to the NAPS frangible portion minimum outer width (428), and the MNS frangible portion maximum outer width (419) is equal to the NAPS frangible portion maximum outer width (429), however one skilled in the art will appreciate that this is not required and would not be the case in alternative geometries.

In one embodiment, the nut frangible section (400) may be formed by attaching the MNS frangible portion distal end (412) to the NAPS frangible portion proximal end (424) with a polymer compound that will break when a specific rotational shear force is applied. In another embodiment the nut (100) may be formed in one uniform piece, after which partial circumferential slots are cut into the nut frangible section (400) at the junction where the MNS frangible portion distal end (412) and the NAPS frangible portion proximal end (424) will form after the rivetless nut plate has been activated. In yet another embodiment the nut (100) may be formed in one uniform piece nut frangible section (400) having both the MNS frangible portion minimum outer width (418) and the NAPS frangible portion minimum outer width (428) fractionally smaller than the MNS frangible portion maximum outer width (419) and the NAPS frangible portion maximum outer width (429) to facilitate shearing the nut (100) into the main nut section (MNS) (200) and the nut axial protrusion section (NAPS) (300) at the junction where the MNS frangible portion distal end (412) and the NAPS frangible portion proximal end (424) will form after the rivetless nut plate has been activated. In one embodiment the nut frangible section (400) is a region of reduced strength, while in another embodiment it is a region of reduced ductility. The nut frangible section (400) may incorporate scoring or scored lines, notches, leaders, nicks, or other lines of weaknesses.

In the illustrated embodiment of FIG. 4B the geometry of the nut frangible section (400) creates an engineered fracture line or stress riser. The main nut section (200) has a MNS wall thickness (208), the nut axial protrusion section (300) has a NAPS section wall thickness (308), and the nut frangible section (400) has a frangible section wall thickness (408). In one embodiment a minimum frangible section wall thickness (408) is less than a minimum MNS wall thickness (208), and in another embodiment a minimum frangible section wall thickness (408) is less than a minimum NAPS section wall thickness (308), in another embodiment a minimum frangible section wall thickness (408) is less than both a minimum MNS wall thickness (208) and a minimum NAPS section wall thickness (308). In another embodiment a minimum frangible section wall thickness (408) is at least 20% less than a minimum MNS wall thickness (208), and in another embodiment a minimum frangible section wall thickness (408) is at least 20% less than a minimum NAPS section wall thickness (308), in another embodiment a minimum frangible section wall thickness (408) is at least 20% less than both a minimum MNS wall thickness (208) and a minimum NAPS section wall thickness (308). In another embodiment a minimum frangible section wall thickness (408) is at least 40% less than a minimum MNS wall thickness (208), and in another embodiment a minimum frangible section wall thickness (408) is at least 40% less than a minimum NAPS section wall thickness (308), in another embodiment a minimum frangible section wall thickness (408) is at least 40% less than both a minimum MNS wall thickness (208) and a minimum NAPS section wall thickness (308). In another embodiment a minimum frangible section wall thickness (408) is at least 60% less than a minimum MNS wall thickness (208), and in another embodiment a minimum frangible section wall thickness (408) is at least 60% less than a minimum NAPS section wall thickness (308), in another embodiment a minimum frangible section wall thickness (408) is at least 60% less than both a minimum MNS wall thickness (208) and a minimum NAPS section wall thickness (308).

With continued reference to FIG. 4B, in another embodiment the nut frangible section (400) includes a stress riser geometry whereby the walls extend outward and include an apex, however it may alternatively extend inward, where in another embodiment the nut frangible section (400) is a V-shaped sidewall projection or indentation, and in a further embodiment the external surface of the apex is further from the longitudinal axis of the nut than the external surface of the NAPS body portion (310), but does not extend beyond the NAPS threaded portion maximum width (329). The frangible section wall thickness (408) may vary in some embodiments, and in one such embodiment the minimum frangible section wall thickness (408) is at least 25% less than the maximum frangible section wall thickness (408), and at least 35% less in another embodiment, and at least 50% in still a further embodiment. In one embodiment, such as illustrated in FIG. 4B, an average frangible section wall thickness (408) within the MNS frangible portion (410) is different than an average frangible section wall thickness (408) within the NAPS frangible portion (420).

Figure 6:
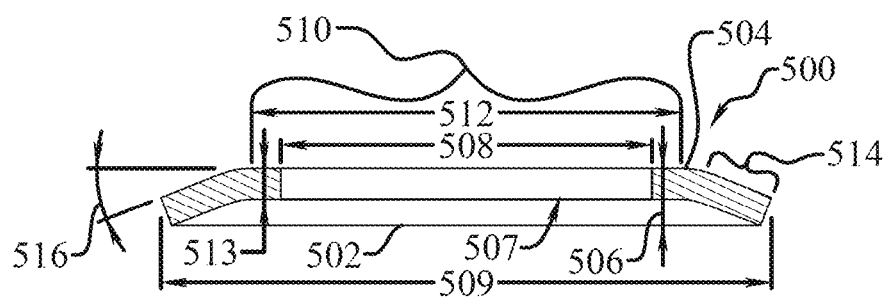
FIG. 6 is a cross-section view of an embodiment of a washer.

The washer (500) as seen in FIGS. 1A, 6, 9-12, and 16-20 may include a washer distal end (502), a washer proximal end (504) that abuts, and may provide a bias force against, the MNS flange (220), and a washer length (506) between the washer distal end (502) and the washer proximal end (504), as best seen in FIG. 6. Further, the washer (500) may also include a washer aperture (507), a washer aperture width (508), a washer outer width (509), a washer flat portion (510) having a washer flat portion width (512) and a washer flat portion length (513), which may be thought of as a washer thickness, and a washer ramp portion (514) having a washer ramp portion angle (516). The washer ramp portion (514) allows the washer (500) to act as a spring to provide a bias force against the main nut section (200). In one embodiment the washer ramp portion angle (516) is 5 to 60 degrees, in another embodiment the washer ramp portion angle (516) is 10 to 45 degrees, in still another embodiment the washer ramp portion angle (516) is at least 15 degrees. Additionally, in one embodiment the washer aperture width (508) is at least 10% less than the MNS flange width (227), and at least 17.5% less in another embodiment, and at least 25% less in yet another embodiment. However, the washer aperture width (508) is at least 55% of the MNS flange width (227), and at least 60% in another embodiment, and at least 65% in still a further embodiment. Additionally, the washer flat portion length (513) is no more than 50% greater than the MNS frangible portion length (416) in one embodiment, and no more than 35% greater in another embodiment, and no more than 10% greater in still a further embodiment. However, in another series of embodiments the washer flat portion length (513) is at least 10% of the MNS frangible portion length (416), and at least 30% in another embodiment, and at least 50% in yet a further embodiment.

Figure 3:
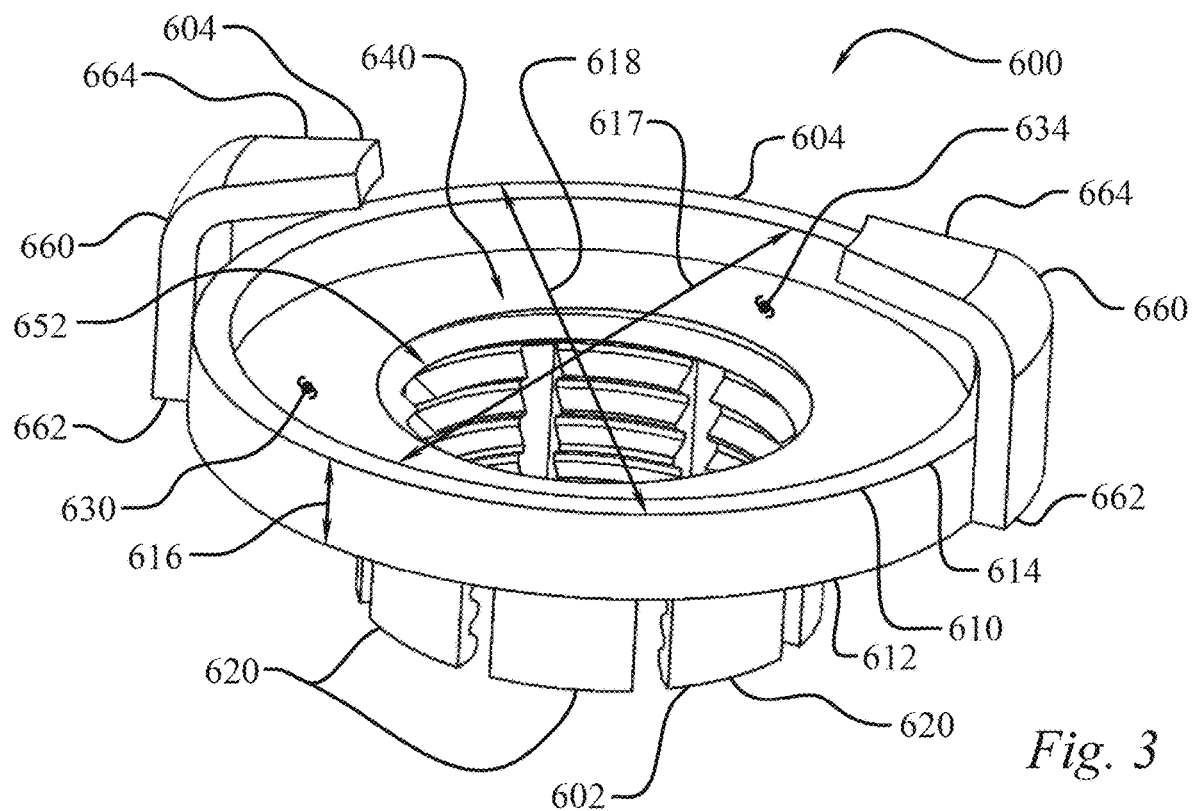
FIG. 3 is an isometric view of an embodiment of a cage.
Figure 5:
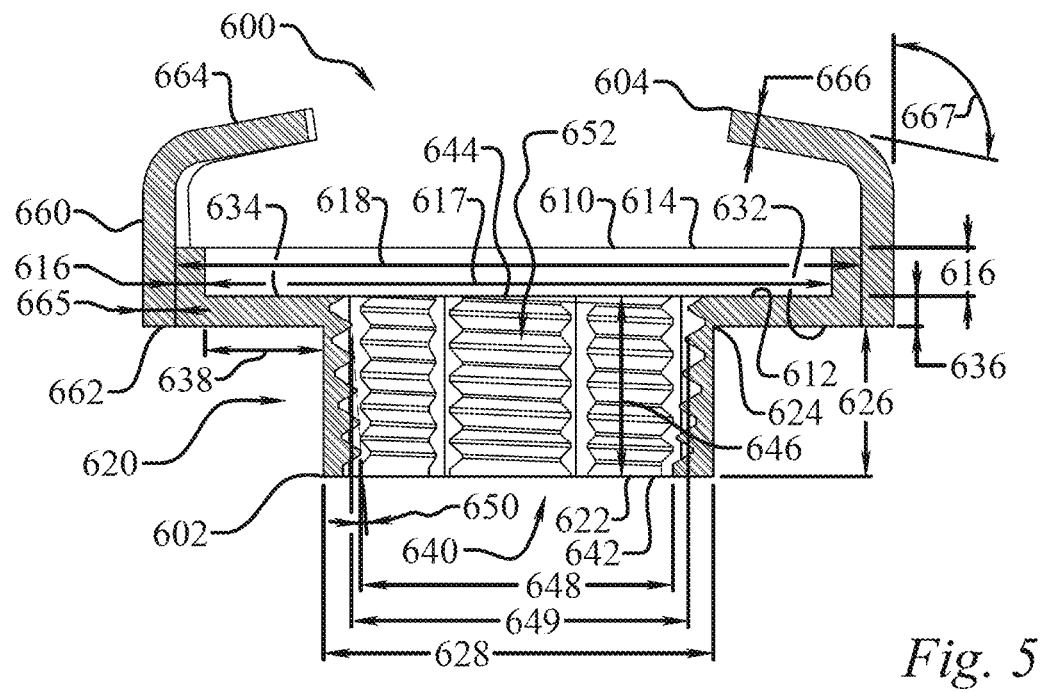
FIG. 5 is a cross-section view of an embodiment of a cage.
Figure 19:
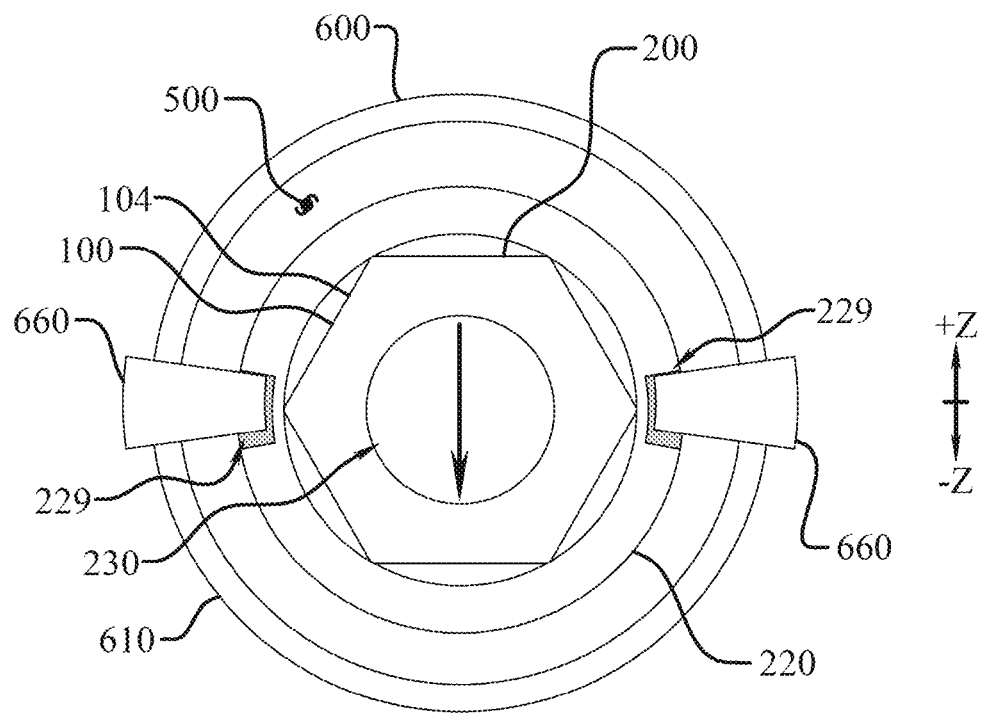
FIG. 19 is a top plan view of an embodiment of a rivetless nut plate showing a linear transition of the main nut section towards the +Z coordinate direction.
Figure 20:
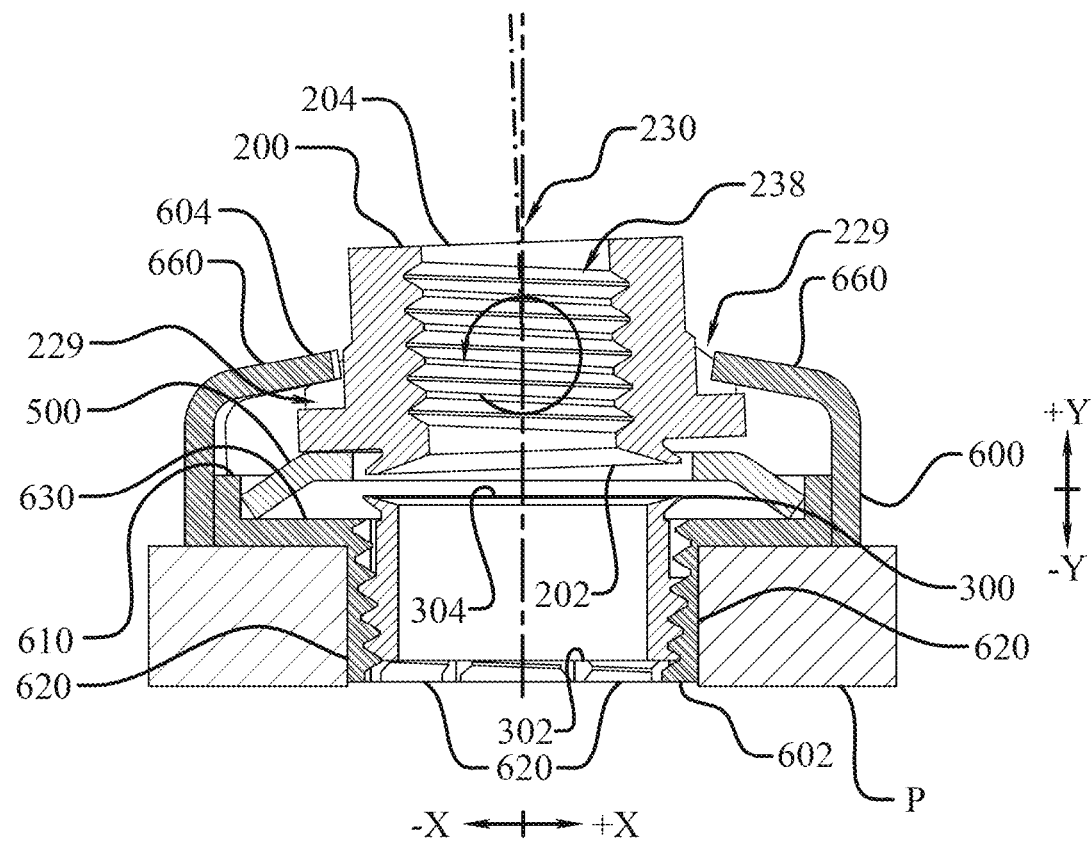
FIG. 20 is a cross-section view of an embodiment of an installed engaged rivetless nut plate, showing a longitudinal rotation.
Figure 21:
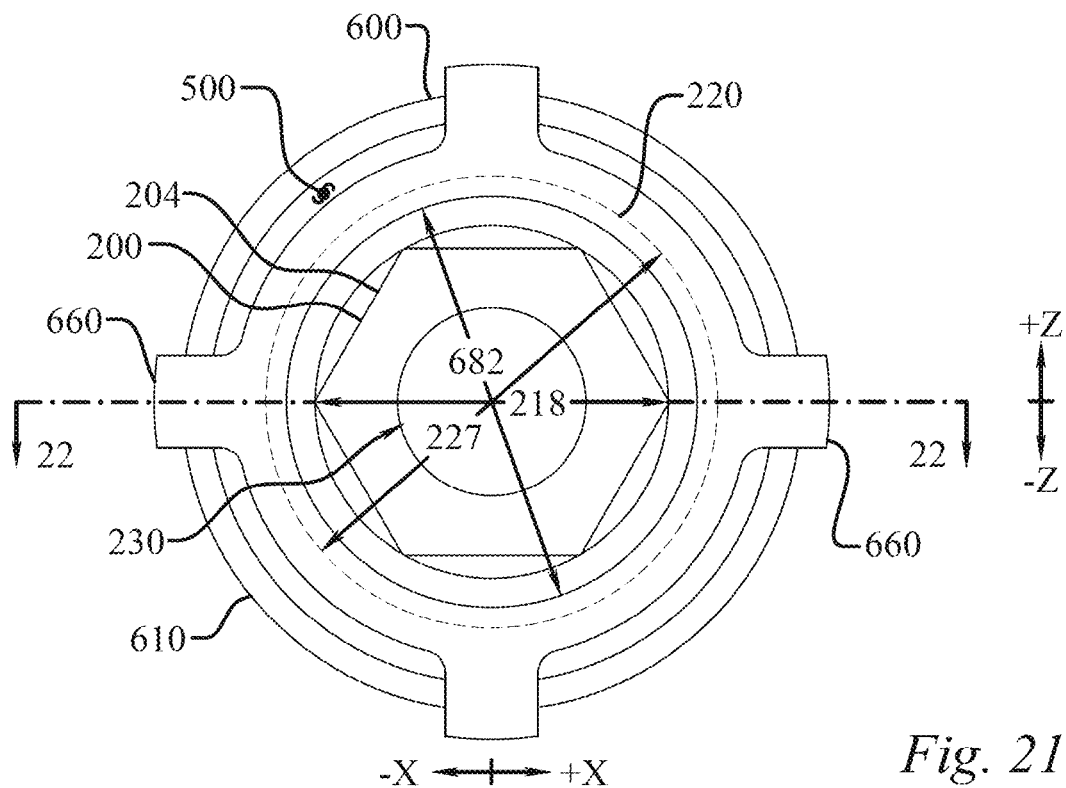
FIG. 21 is a top plan view of an embodiment of a rivetless nut plate having a nut locking strap.
Figure 22:
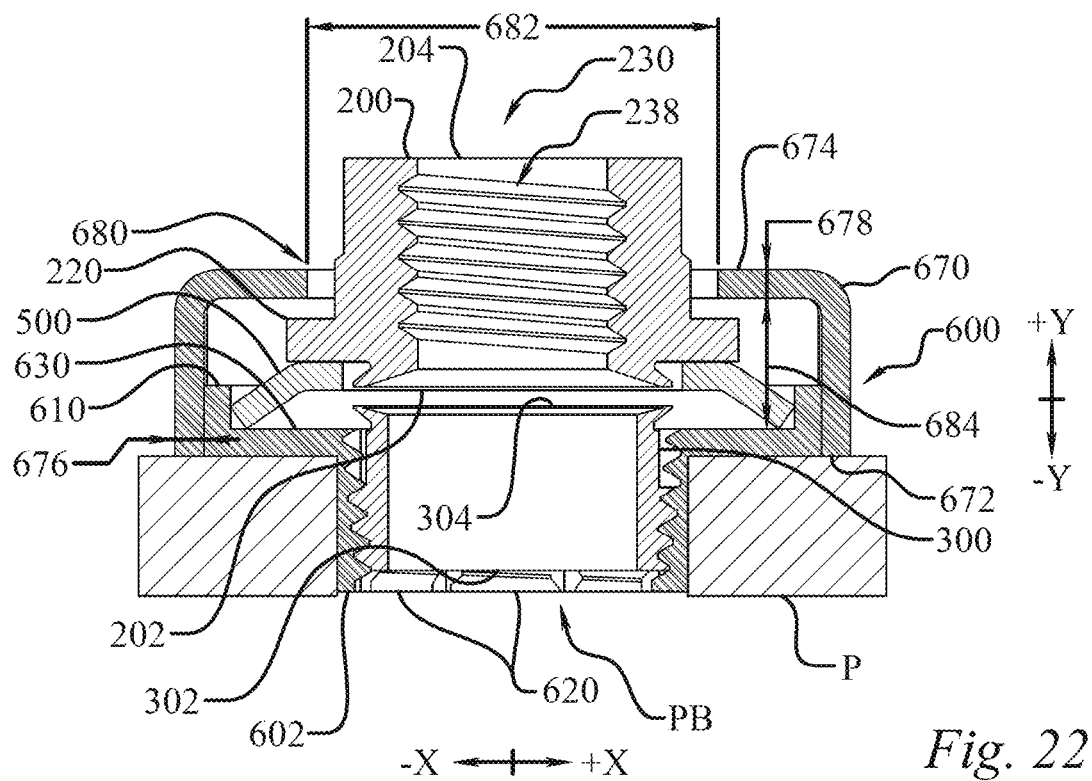
FIG. 22 is a cross-section view of an embodiment of an installed engaged rivetless nut plate having a nut locking strap.

Now referring to the cage (600) as seen in FIGS. 1A, 1B, 3, 5, 9-12, and 17-20. With reference to FIGS. 3, 5, and 8, the cage (600) may include a cage distal end (602) that faces the panel (P) onto which is to be installed, and a cage proximal end (604) that faces the direction of the tool engagement portion (210). Additionally, the cage (600) may further include a washer retaining rim (610), a cage locking projection (620), a cage radial flat interconnect (630), a cage locking projection bore (640), and at least one nut securing device, which may include at least one nut locking prong (660), as seen in FIG. 3, a nut locking entrapment strap (670), as seen in FIGS. 21 and 22, or other interconnection joint that facilitates retainage of the nut (100) while providing the floating features, aka movement, described herein. The cage radial flat interconnect (630) is not limited to a continuous solid surface, and in one embodiment is simply a continuation of the cage locking projections (620) and may be composed of multiple individual pieces.

With reference now to FIG. 5, the washer retaining rim (610) may include a washer retaining rim distal end (612) on the same side as the cage distal end (602), a washer retaining rim proximal end (614) that extends above the surface of the cage radial flat interconnect (630), a washer retaining rim length (616) between the washer retaining rim distal end (612) and the washer retaining rim proximal end (614), a washer retaining rim inner width (617), seen in FIG. 3, and a washer retaining rim outer width (618), wherein half of the difference between the washer retaining rim outer width (618) and the washer retaining rim inner width (617) defines a rim thickness. The washer retaining rim (610) secures the washer (500) within the rivetless nut plate, and also in some embodiments provides a surface to attach the nut securing device, such as the nut locking prongs (660) of FIG. 3 or nut locking entrapment strap (670) of FIGS. 21 and 22. In the illustrated embodiment the washer retaining rim (610) provides a full 360 perimeter, however in another embodiment the washer retaining rim (610) is discontinuous and consists of at least two rim sections extending away from the cage radial flat interconnect (630). Alternatively, the cage radial flat interconnect (630) may be formed with a recess or channel to engage and retain a portion of the washer (500). Further, while the illustrated embodiments show a washer (500) extending a full 360 degrees, in another embodiment the washer (500) consists of at least two deflectable arms extending from the cage radial flat interconnect (630), while further embodiments the washer (500) is an elastically deflectable gasket, at least two elastically deflectable plugs or springs, and/or a helical spring, any of which providing all of the disclosed functions and relationships associated with the washer (500) and function as a biasing member. Thus all of the disclosure with respect to the washer (500) applies equally to a biasing member that may take any form and structure, and is not limited to a radial device continuously and uniformly biasing the main nut section (200).

In one embodiment the washer retaining rim inner width (617) is no more than 15 percent larger than the washer outer width (509) in an undeformed state, in another embodiment the washer retaining rim inner width (617) is no more than 10 percent larger than the washer outer width (509) in an undeformed state, while in yet another embodiment the washer retaining rim inner width (617) is no more than 5 percent larger than the washer outer width (509) in an undeformed state. The cage radial flat interconnect (630) may include a cage radial flat interconnect distal end (632) that abuts a panel (P) that the rivetless nut plate is being affixed to, as seen in FIG. 5, a cage radial flat interconnect proximal end (634) upon which the washer distal end (502)

abuts, a cage radial flat interconnect length (636), and a cage radial flat interconnect width (638). In one embodiment the cage radial flat interconnect length (636) is at least 50% of the washer flat portion length (513), while in another embodiment the cage radial flat interconnect length (636) is at least 75% of the washer flat portion length (513), and in still yet another embodiment the cage radial flat interconnect length (636) is no more than 200% of the washer flat portion length (513). Additionally, with continued reference to FIG. 5, in one embodiment the washer retaining rim length (616) is at least 50% of the cage radial flat interconnect length (636), in another embodiment the washer retaining rim length (616) is at least 75% of the cage radial flat interconnect length (636), and in still yet another embodiment the washer retaining rim length (616) is at least 100 percent of the cage radial flat interconnect length (636). The cage radial flat interconnect (630) connects the washer retaining rim (610) to the cage locking projection (620) portion of the cage (600), further the cage radial flat interconnect (630) provides a surface upon which the washer (500) rest and is biased upon to create a compression force against the MNS distal end (202).

With continued reference to FIG. 5, the cage locking projection (620) may include a cage locking projection distal end (622), a cage locking projection proximal end (624) that is attached to the cage radial flat interconnect (630), a cage locking projection length (626) between the cage locking projection distal end (622) and the cage locking projection proximal end (624), and a cage locking projection outer width (628). In one embodiment the cage radial flat interconnect width (638) is at least 30% of the cage locking projection length (626), and at least 40%, and at least 50% in further embodiments; however additional embodiments introduce an upper limit on this relationship via the cage radial flat interconnect width (638) being no more than 200% of the cage locking projection length (626), and no more than 175%, and no more than 150% in further embodiments. In another embodiment the surface area of the cage radial flat interconnect (630) at the cage radial flat interconnect distal end (632), namely the surface area that will contact the panel (P), is at least 70% of the cross-sectional area associated the NAPS bore diameter (347), seen in FIG. 8, and at least 90% in another embodiment, and at least 105% in yet a further embodiment.

In one embodiment the cage locking projection length (626), seen in FIG. 5, is at least 60% of the NAPS length (306), seen in FIG. 8, at least 70% in another embodiment, and at least 80% in still a further embodiment; additionally, another series of embodiments caps the relationship so that the cage locking projection length (626) is no more than 150% of the NAPS length (306), and no more than 125% in another embodiment, and no more than 100% in still a further embodiment. As seen in FIG. 10, the cage locking projection (620) is designed to be inserted within a panel bore (PB) and is configured to expand to the diameter of the panel bore (PB) and frictionally held in place when the rivetless nut plate is installed. Additionally, in one embodiment the cage locking projection (620) includes grip promoting features located around the cage locking projection (620) perimeter to help induce friction, such features includes grooves, projections, surface texturing such as knurling, and/or a friction inducing compound or coating, which may include a granular material. In one embodiment the arithmetic mean roughness of a portion of the exterior surface of the cage locking projection (620) is at least 1.0 and at least 2.5 µm in another embodiment, and at least 5.0 µm in still a further embodiment.

Referring again to FIG. 5, located within the center of the cage locking projection (620) is the cage locking projection bore (640) which may include a cage locking projection bore distal end (642) that terminates at the cage locking projection distal end (622), a cage locking projection bore proximal end (644) that terminates at the cage radial flat interconnect proximal end (634), a cage locking projection bore length (646) between the cage locking projection bore distal end (642) and the cage locking projection bore proximal end (644), a cage locking projection bore minimum width (648), a cage locking projection bore maximum width (649), a cage locking projection bore taper angle (650) formed by the transition from the cage locking projection bore maximum width (649) to the cage locking projection bore minimum width (648), and cage locking projection threads (652) which engages the previously mentioned NAPS threaded portion (320). The NAPS threaded portion (320) has NAPS threaded portion threads (332) with a NAPS threaded portion taper angle (330). Likewise, the cage locking projection bore (640) has cage locking projection threads (652) with a cage locking projection bore taper angle (650). In one embodiment the NAPS threaded portion maximum width (329) is 1 to 10 percent larger than the NAPS threaded portion minimum width (328), and the cage locking projection bore maximum width (649) is 1 to 10 percent larger than the cage locking projection bore minimum width (648). In another embodiment the NAPS threaded portion maximum width (329) is 2 to 8 percent larger than the NAPS threaded portion minimum width (328), and the cage locking projection bore maximum width (649) is be 2 to 8 percent larger than the cage locking projection bore minimum width (648). In still another embodiment the NAPS threaded portion maximum width (329) is 3 to 7 percent larger than the NAPS threaded portion minimum width (328), and the cage locking projection bore maximum width (649) is 3 to 7 percent larger than the cage locking projection bore minimum width (648).

The cage locking projection bore taper angle (650) in the cage locking projection bore (640) interacts with the NAPS threaded portion taper angle (330) located on the NAPS threaded portion (320) to effect the expansion and frictional forces of the cage locking projection (620) against the panel bore (PB) walls. In one embodiment of cage locking projection (620) is continuous around it circumference without any slits, while in another embodiment the cage locking projection (620) may have at least one slit, while still in further embodiments the cage locking projection (620) may have at least two, three, or four slits to allow for further facilitate expansion. A maximum locking projection thickness is one half of the difference between the cage locking projection outer width (628) and the cage locking projection bore minimum width (648), as seen in FIG. 5. The distance between adjacent cage locking projections (620) is a projection gap (629), seen in FIG. 1B. In one embodiment the projection gap (620) is at least 50% of the maximum locking projection thickness, and at least 70% and 90% in further embodiments, however in another series of embodiments the projection gap (629) is no more than 300% of the maximum locking projection thickness, and no more than 250% and 200% in further embodiments. In yet another embodiment the sum of all the projection gaps (629) account for no more than 180 degrees of the 360 degree perimeter of the cage locking projection (620), and no more than 145 degrees, 110 degrees, 90 degrees, 60 degrees, 45 degrees, and 30 degrees, in further embodiments.

In one embodiment the cage locking projection threads (652) and the NAPS threaded portion threads (332) may each have separate components of an epoxy compound that is mixed and thereafter hardens when the rivetless nut plate is activated, thereby preventing the NAPS threaded portion (320) from loosening in the cage locking projection bore (640). Additionally, in another embodiment an electrical current may be used to fuse the NAPS threaded portion (320) within the cage locking projection bore (640) after the rivetless nut plate has been installed and activated, thereby preventing the nut axial protrusion section (NAPS) (300) from loosening in the cage locking projection bore (640).

Referring again to FIG. 5, the cage (600) embodiment having locking prongs (660), which extend away from the cage radial flat interconnect (630), may include a nut locking prong distal end (662) located at the same side as the cage radial flat interconnect distal end (632), a nut locking prong proximal end (664) at the end most distant from the cage radial flat interconnect (630), which is designed to capture and retain the nut (100) by abutting the MNS flange (220) or tool engagement portion (210) in some embodiments, a nut locking prong distal end width (665), a nut locking prong proximal end width (666), and a nut locking prong transition angle (667). When the rivetless nut plate has been activated, via rotation from a location such as that in FIG. 1A to that of FIG. 1B, in an embodiment having locking prongs (660) the nut locking prong proximal end (664) drops into and is captured by the MNS flange nut locking prong receiving recess (229), as seen in FIG. 12, or rather one may think of it as the nut (100) being forced away from the panel (P) upon separation of the nut frangible section (400) resulting in the receiving recess (229) moving outward and around the stationary locking prongs (660). Therefore, one skilled in the art will appreciate that the receiving recesses (229) form a rotation prevention interface that captures a portion of the main nut section (200) upon separation at the nut frangible section (400) via longitudinal movement of the main nut section (200) as it is biased by the washer (500). Further, the rotation prevention interface may take the form of any complimentary geometry that in one embodiment permits rotation as the threads are engaged and the nut (100) moves toward the cage distal end (602), but upon separation of the nut frangible section (400) and longitudinal displacement of the main nut section (200) an engagement distance away from the cage distal end (602), via the washer (500), the complimentary geometry prevents rotation of the nut (100) more than 20 degrees but facilitates a predetermined amount of translational movement and tilting from the longitudinal axis to accommodate imperfect alignment of a subsequent fastener's engagement with the nut (100), as will be discussed in more detail later. In another embodiment the complimentary geometry prevents rotation of the nut (100) more than 15 degrees, 10 degrees, and 7.5 degrees in additional embodiments, while still facilitating a predetermined amount of translational movement and tilting from the longitudinal axis to accommodate imperfect alignment of a subsequent fastener's engagement with the nut (100). While in still a further embodiment the complimentary geometry is specifically configured to allow rotation of the nut (100) at least 2.5 degrees, 5 degrees, and 7.5 degrees in additional embodiments, while still facilitating a predetermined amount of translational movement and tilting from the longitudinal axis to accommodate imperfect alignment of a subsequent fastener's engagement with the nut (100). As seen in FIG. 12, the receiving recess (229) has a recess height measured in the Y direction and a recess depth measured in the X direction, and in some embodiments either, or both, are greater than nut locking prong proximal end width (666), seen in FIG. 5, and in further embodiments either may be at least 25%, 50%, 75%, or 100% greater than nut locking prong proximal end width (666).

Figure 18:
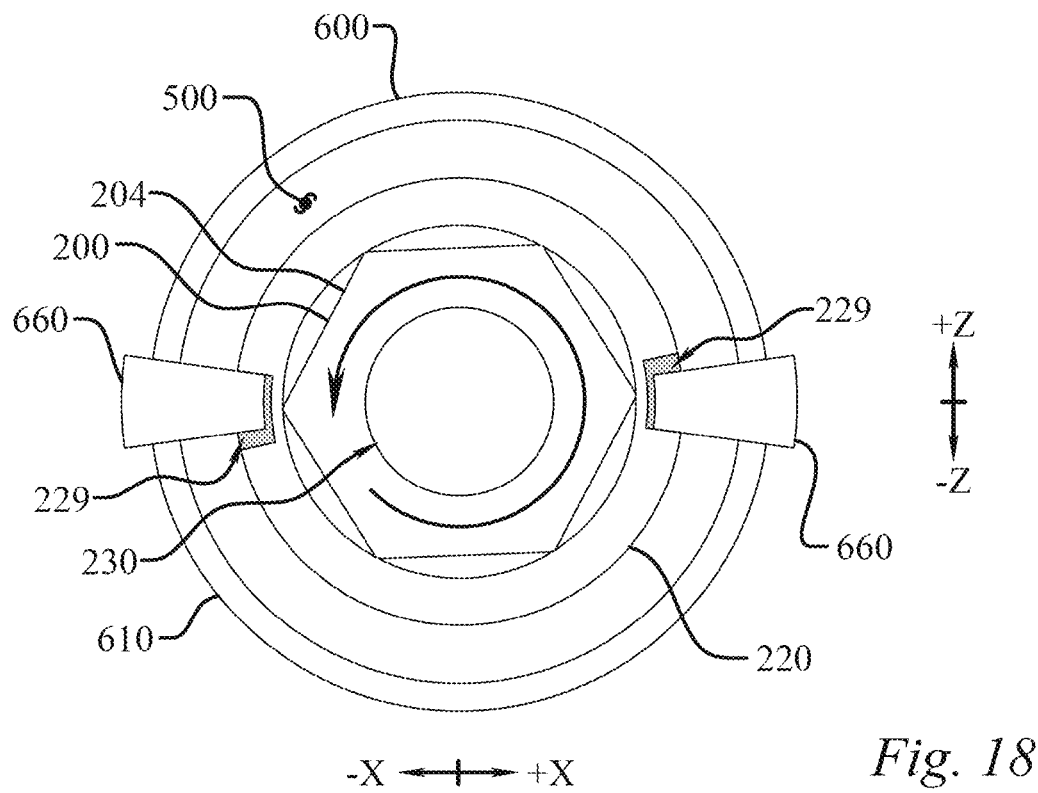
FIG. 18 is a top plan view of an embodiment of a rivetless nut plate showing a radial transition of the main nut section about the Y coordinate axis.

In one embodiment the thickness of the locking prongs (660) varies, and in another embodiment the nut locking prong distal end width (665) is greater than the nut locking prong proximal end width (666), in another embodiment the nut locking prong distal end width (665) is at least 10% greater than the nut locking prong proximal end width (666), in still yet another embodiment the nut locking prong distal end width (665) at least 20% greater than the nut locking prong proximal end width (666). As seen in FIG. 18, in an embodiment the top plan view sidewalls of the nut locking prongs (660) are not parallel, and in one embodiment taper toward one another as they approach MNS flange nut locking prong receiving recess (229), while in a further embodiment a prong convergence angle between the sidewalls is at least 2.5 degrees, and at least 5.0, 7.5, and 9.0 degrees in additional embodiments. However, in further embodiments the prong convergence angle is no greater than 45 degrees, and no greater than 40, 35, 30, and 25 degrees in additional embodiments. Similarly, also seen in FIG. 18, in an embodiment the top plan view sidewalls of the MNS flange nut locking prong receiving recess (229) are not parallel, and in one embodiment taper toward one another as they approach a central longitudinal axis of the nut (100), while in a further embodiment a recess convergence angle between the sidewalls is at least 2.5 degrees, and at least 5.0, 7.5, and 9.0 degrees in additional embodiments. However, in further embodiments the recess convergence angle is no greater than 45 degrees, and no greater than 40, 35, 30, and 25 degrees in additional embodiments. These sidewall relationships further enable later disclosed goals regarding the constrained X and Z movement of the main nut section (200).

The cage (600) embodiment having a nut locking entrapment strap (670), as seen in FIGS. 21 and 22, may further include a nut locking entrapment strap distal end (672) that faces a direction towards the panel (P) that the rivetless nut plate is being installed, a nut locking entrapment strap proximal end (674) that faces in a direction away from the panel (P) which the rivetless nut plate is being installed, a nut locking entrapment strap distal end width (676), a nut locking entrapment strap proximal end height (678), a nut locking entrapment strap aperture (680), a nut locking entrapment strap aperture width (682), and a nut locking entrapment strap to cage radial flat interconnect distance (684). When the rivetless nut plate is assembled the tool engagement portion (210) extends through the nut locking entrapment strap aperture (680) and the nut locking entrapment strap proximal end (674) completely encircles the circumference of the tool engagement portion (210). In one embodiment the nut locking entrapment strap aperture width (682) is at least 5% larger than the tool engagement portion maximum width (218), and at least 10% greater and 15% greater in further embodiments; while another series of embodiments cap the relationship such that the nut locking entrapment strap aperture width (682) is no more than 50% larger than the tool engagement portion maximum width (218), and 40% and 30% in further embodiments.

Furthermore, in one embodiment the nut locking entrapment strap to cage radial flat interconnect distance (684) is 60 to 120 percent of the MNS length (206), in another embodiment the nut locking entrapment strap to cage radial flat interconnect distance (684) is 80 to 100 percent of the MNS length (206), in yet another embodiment the nut locking entrapment strap to cage radial flat interconnect distance (684) is at least 90 percent of the MNS length (206).

In one embodiment the nut locking entrapment strap proximal end height (678) is 80 to 120 percent of the length of the washer retaining rim length (616), in another embodiment the nut locking entrapment strap proximal end height (678) is 90 to 110 percent of the length of the washer retaining rim length (616), in yet another embodiment the nut locking entrapment strap proximal end height (678) is at least 90 percent of the length of the washer retaining rim length (616). In similar fashion, in one embodiment the nut locking entrapment strap distal end width (676) is 80 to 120 percent of the length of the washer retaining rim length (616), in another embodiment the nut locking entrapment strap distal end width (676) may be 90 to 110 percent of the length of the washer retaining rim length (616), in still yet another embodiment the nut locking entrapment strap distal end width (676) is at least 90 percent of the washer retaining rim length (616). Additionally, in one rivetless nut plate embodiment having a nut locking entrapment strap (670), or any other disclosed embodiment, may utilize a main nut section (200) that lacks a MNS flange tapered region (228) and a MNS flange nut locking prong receiving recess (229), also seen in FIGS. 21 and 22. All disclosure regarding the nut locking entrapment strap to cage radial flat interconnect distance (684) applies equally to all other embodiments including those non-strap embodiments such as the complimentary geometry of the rotation prevention interface, including the illustrated locking prong (660) embodiments.

In another rivetless nut plate embodiment having a nut locking entrapment strap (670) may utilize a main nut section (200) having MNS flange nut locking prong receiving recesses (229) that engage detents located on the a nut locking entrapment strap distal end (672) thereby preventing rotation of the engaged main nut section (200), not illustrated in the drawings but disclosed as another rotation prevention interface. Furthermore, any components of the rotation prevention interface, such as the locking prongs (660) or nut locking entrapment strap (670), may be permanently attached to the cage washer retaining rim (610) by brazing, soldering, welding, gluing, or alternatively in another embodiment uniformly formed as a part of the washer retaining rim (610). In one embodiment, the nut locking prongs (660) may be formed by bending previously straight nut locking prongs (660) to a desired nut locking prong transition angle (667) before, or after, attachment to the cage (600). In this embodiment the nut (100), washer (500), and the cage (600) are pre-assembled before the nut locking prongs (660) are permanently attached to the cage (600). In another embodiment the nut locking prongs (660) are pre-attached to the cage (600) and the previously straight nut locking prongs (660) are bent to a desired nut locking prong transition angle (667) after the nut (100), washer (500), and the cage (600) are assembled, and likewise for the nut locking entrapment strap (670) embodiments.

The nut locking prong transition angle (667) in one embodiment is greater than 90 degrees, and greater than 120 degrees and 150 degrees in further embodiments. In additional embodiments the nut locking prong transition angle (667) is 90 to 180 degrees, in another embodiment the nut locking prong transition angle (667) may be 110 to 170 degrees, in yet another embodiment the nut locking prong transition angle (667) is 120 to 160 degrees. Additionally, in the embodiment utilizing a nut locking entrapment strap (670), the nut (100), washer (500), and the cage (600) are pre-assembled before the nut locking entrapment strap (670) is permanently attached to the cage (600).

Now referencing FIGS. 1A-10, the rivetless nut plate is assembled by first inserting the washer (500) within the washer retaining rim (610) with the washer distal end (502) resting upon the cage radial flat interconnect proximal end (634). Next, the nut distal end (102) is inserted through the washer aperture (507) into the NAPS bore (340) and the nut (100) is rotated in relation to the cage (600) wherein the NAPS threaded portion (320) on the nut (100) engages the cage locking projection threads (652) and draws the nut (100) into the cage (600) and may engage the washer (500). As stated earlier, the cage locking projection bore taper angle (650) in the cage locking projection bore (640) interacts with the NAPS threaded portion taper angle (330) located on the NAPS threaded portion (320) resulting in expansion of the cage locking projection (620) and engagement with the panel bore (PB) walls. However, during the assembly of the rivetless nut plate, the cage locking projection (620) is not bound by any panel bore (PB) walls and will undesirably expand if the nut (100) is over rotated. As such, during assembly the nut (100) is only rotated in relation to the cage (600) to the point before the cage locking projection (620) start to expand. Afterwards, the nut locking prongs (660) are bent to, or attached at, the desired nut locking prong transition angle (667). In yet another embodiment, the nut locking entrapment strap (670) is attached to the cage (600) instead of the nut locking prongs (660), as illustrated in FIGS. 21 and 22.

Now referring back to FIG. 1A, the nut (100) rests upon the washer (500) within the cage (600) and the cage locking prongs distal ends (662) about the MNS flange (220) on the MNS flange tapered region (228). In FIG. 1B, the rivetless nut plate has been rotated to an activated position the main nut section (200) has separated from the nut axial protrusion section (300), as seen in FIG. 12, and has been biased by the washer (500) within the cage (600) away from the fixed nut axial protrusion section (300) but is held in place, and prevented from rotating, by the cage locking prongs (660) which have engaged the MNS flange nut locking prong receiving recesses (229). FIGS. 21 and 22 shows an embodiment wherein the main nut section (200) rests upon the washer (500) within the cage (600) and the main nut section (MNS) (200) is held in place by the nut locking entrapment strap (670). Additionally, the washer (500) may provide a constant biasing force on the nut (100) against the cage locking prongs (660) in one embodiment, or alternatively against the nut locking entrapment strap (670) in another embodiment.

Figure 9:
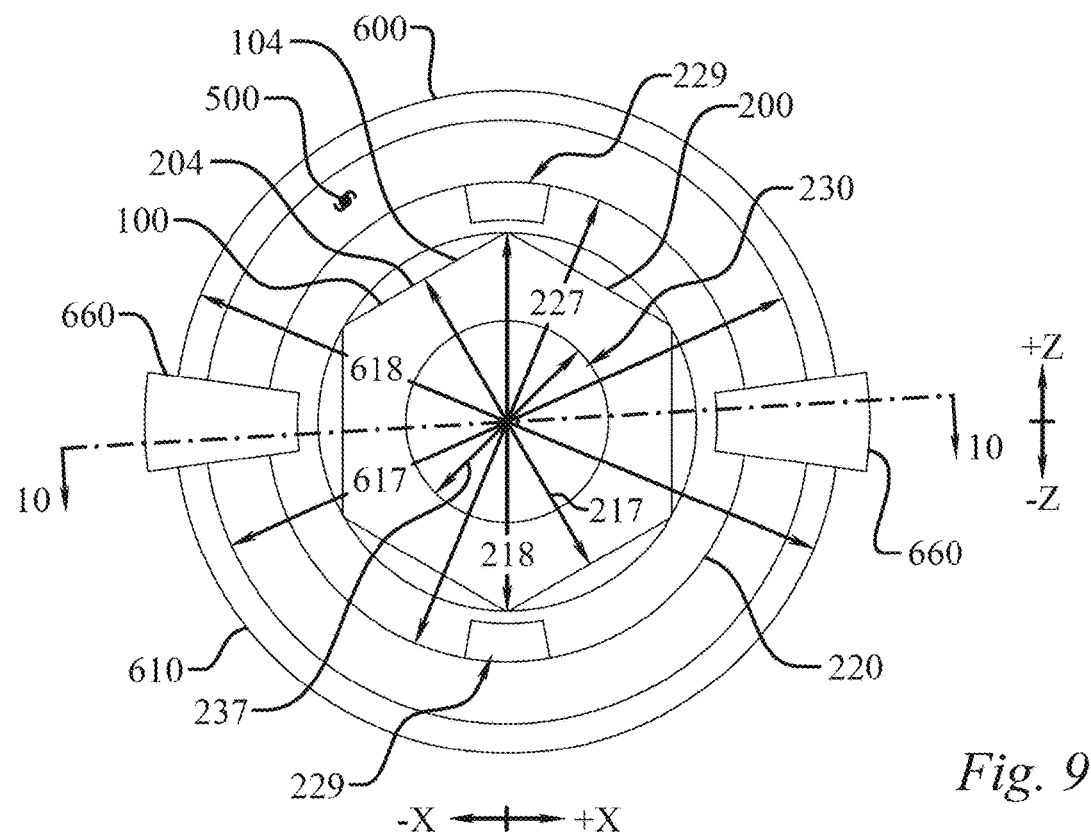
FIG. 9 is a top plan view of an embodiment of a rivetless nut plate.
Figure 13:
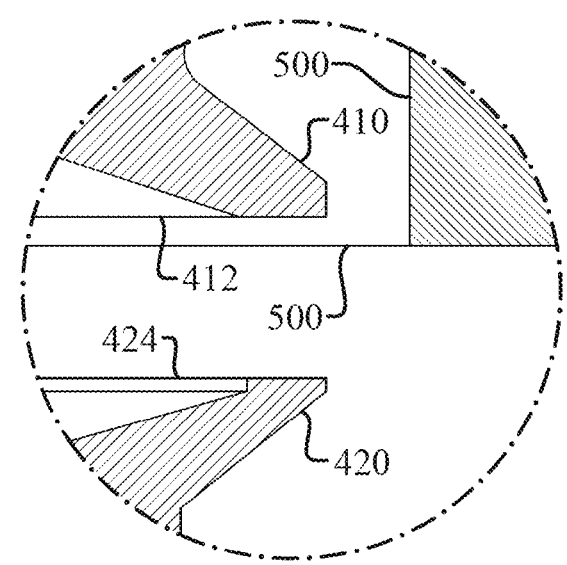
FIG. 13 is a magnified view referenced in FIG. 12.
Figure 14:
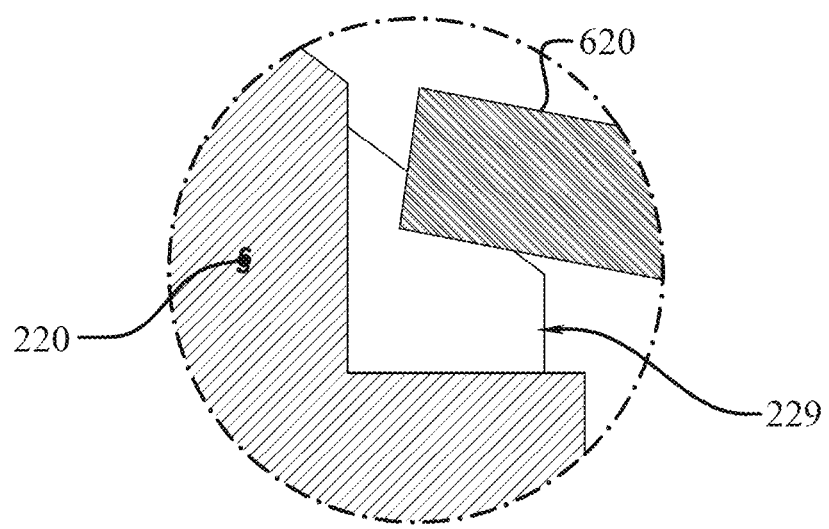
FIG. 14 is another magnified view referenced in FIG. 12.
Figure 15:
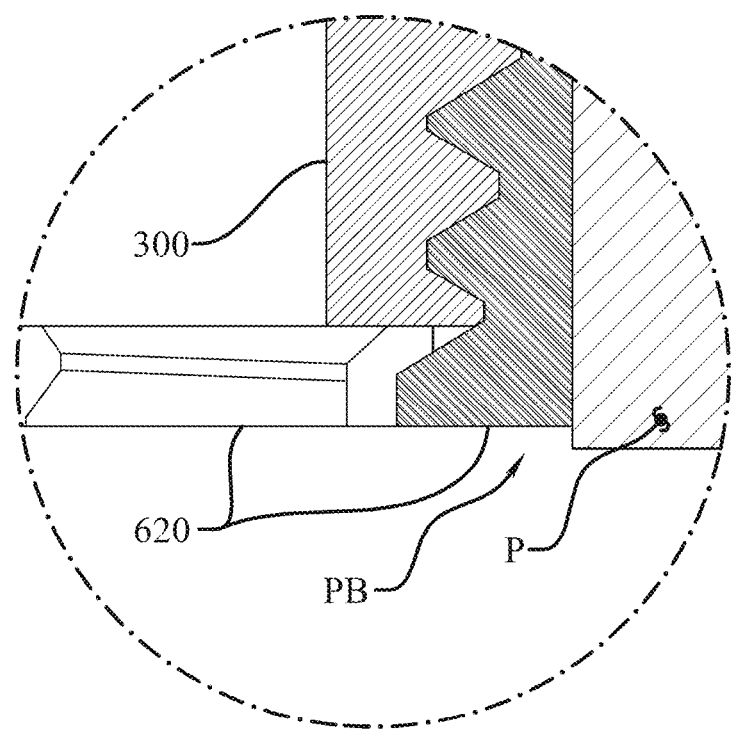
FIG. 15 is another magnified view referenced in FIG. 12.

FIGS. 1A, 9 and 10 shows the rivetless nut plate in a nonactivated state wherein the nut (100) has not been rotated to the point of separating the nut frangible section (400). Furthermore, the nonactivated state where the cage locking prongs (660) are not recessed in the MNS flange nut locking prong receiving recesses (229). However, in FIGS. 1B, 11, 12, and 16-20 the nut (100) has been rotated into an activated state whereby the nut frangible section (400) has separated and the nut (100) has been displaced by the washer (500), and a portion of the cage locking prongs (660) are now recessed within the MNS flange nut locking prong receiving recesses (229) thereby preventing rotation of the nut (100) so that a subsequent fastener may engage the nut (100). Further, as the nut (100) is being rotated into an activated position, the cage locking projection bore taper angle (650) in the cage locking projection bore (640) interacts with the NAPS threaded portion taper angle (330) located on the NAPS threaded portion (320) to effect the expansion and engagement of the cage locking projection (620) against the panel bore (PB) wall. Once the cage locking projection outer width (628) expands to that of the panel bore (PB) diameter, the nut axial protrusion section (300) of the nut (100) cannot rotate. As such, the nut (100) fractures along a nut frangible section (400) to separate the main nut section (200) and the nut axial protrusion section (NAPS) (300), as seen in FIGS. 4A, 4B, 7, 8, 12 and 13. In addition, the nut frangible section (400) separates into the MNS frangible portion (410) and the NAPS frangible portion (420). The MNS frangible portion distal end (412) may also be located at the MNS distal end (202), and the nut frangible section proximal end (404) along with the MNS frangible portion proximal end (414) may be located at the MNS bore distal end (232), as seen in FIGS. 7 and 13.

The materials, thickness, cage locking projection (620) design, NAPS threaded portion taper angle (330) and/or cage locking projection bore taper angle (650), washer (500) design, and the design of the nut frangible section (400), among other variables, influence the amount of rotation of the nut (100) required to result in separation of the nut frangible section (400), and the resulting allowable adjustment of the main nut section (200). In one embodiment these variables and the disclosed relationships ensure that once the threads have engaged enough that the flange distal end (222) is in contact with the washer (500), rotation of 540 degrees or less of the nut (100) will result in failure of the nut frangible section (400) whether or not the cage locking projection (620) is constrained by a panel bore (PB), while in a further embodiment rotation of 450 degrees or less, 360 degrees or less, and 300 degrees or less separates the nut frangible section (400). Further, once the threads have engaged enough that the flange distal end (222) is in contact with the washer (500) and the cage locking projection (620) is not constrained by a panel bore (PB), rotation of at least 45 degrees will not result in failure of the nut frangible section (400), and in additional embodiments rotation of at least 60 degrees, 75 degrees, and 90 degrees will not result in failure of the nut frangible section (400). The NAPS threaded portion taper angle (330) and/or cage locking projection bore taper angle (650) is at least 0.5 degrees in an embodiment, and at least 1.0, 1.5, 2.0, and 2.5 degrees in additional embodiments; however, in further embodiments the NAPS threaded portion taper angle (330) and/or cage locking projection bore taper angle (650) is no more than 15 degrees, and no more than 12.5, 10, 7.5, and 5.0 degrees in additional embodiments.

Breakage of the nut frangible section (400) separates the main nut section (200) from the nut axial protrusion section (300), which is fixed in the cage (600), as seen in FIG. 12, which allows the main nut section (200) to "float" or have a certain range of movement adjustability while still being constrained by the cage (600). Therefore, once the nut plate is installed and the main nut section (200) is floating, a second panel or component may be placed adjacent to the panel (P). The second panel or component will have a second bore through which a fastener will pass and enter the NAPS threaded portion (320), which is fixed to the cage (600) and thus the first panel (P). The fastener will pass through the NAPS bore (340) to ultimately engage the floating main nut section (200). The second bore will rarely align perfectly and therefore a predetermined amount of play, or movement, in the location of the floating main nut section (200) greatly simplifies assembly. Such alignment issues increase as more fasteners are used. FIGS. 16-20 illustrate various ways in which the main nut section (200) may float within the cage (600), with the gap between the nut locking prongs (660) and the MNS flange nut locking prong receiving recesses (229) shown in grey-scale to more easily illustrate their relative positions.

Figure 16:
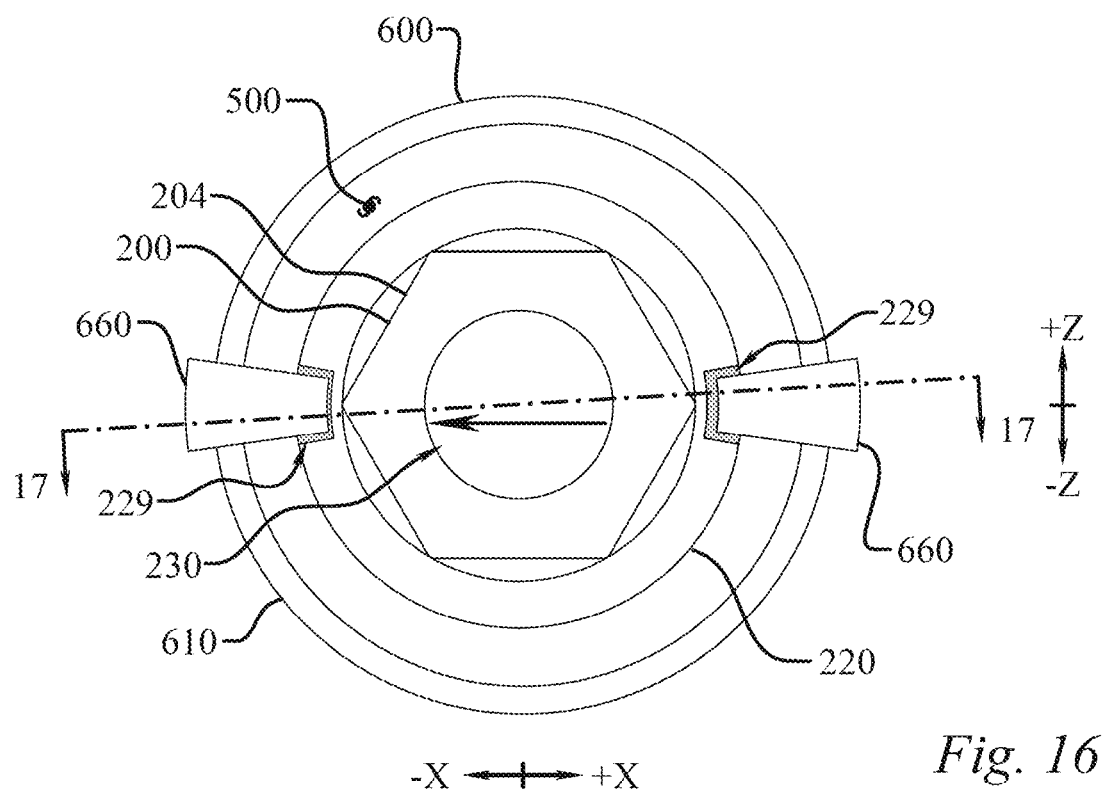
FIG. 16 is a top plan view of an embodiment of a rivetless nut plate showing a linear transition of the main nut section towards the −X coordinate direction.
Figure 17:
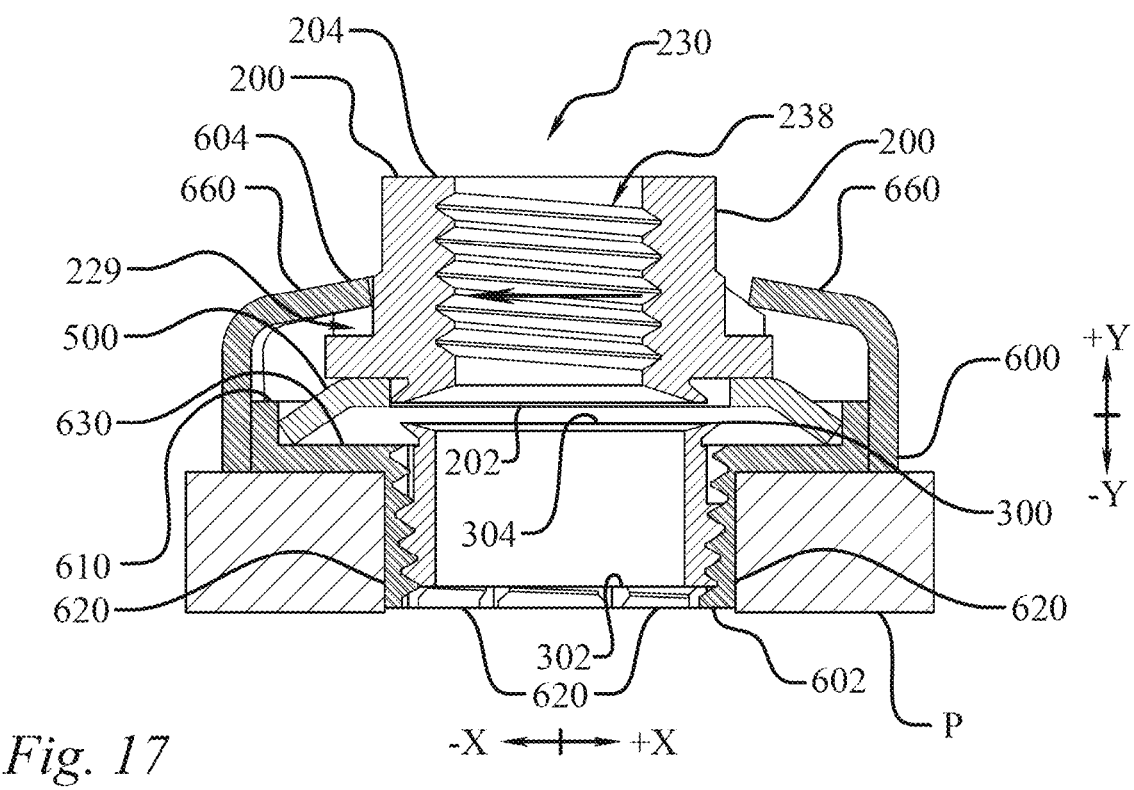
FIG. 17 is a cross-section view of an embodiment of an installed engaged rivetless nut plate, showing a linear transition of the main nut section towards the −X coordinate direction, taken along section line 17-17 in FIG. 16.

For instance, FIGS. 16 and 17 illustrate a rivetless nut plate wherein the main nut section (200) has transitioned to the −X direction. Additionally, FIG. 18 shows an embodiment of rivetless nut plate where the main nut section (200) has rotated counter-clockwise about the Y axis with the degree of rotation limited by the nut locking prongs (660) in combination with the MNS flange nut locking prong receiving recesses (229). Further, FIG. 19 shows an embodiment of rivetless nut plate where the main nut section (200) has transitioned towards the −Z direction, again with the freedom of movement limited by the nut locking prongs (660) in combination with the MNS flange nut locking prong receiving recesses (229). Still further, FIG. 20 illustrates an embodiment of rivetless nut plate where the MNS longitudinal axis of main nut section (200) is rotated counter-clockwise a predetermined angular rotation with respect to the NAPS longitudinal axis of the nut axial protrusion section (300).

In addition to the desired durability, reliability, and ease of use, the predetermined constrained freedom of movement, or amount of adjustment, of the main nut section (200) in the X, Y, and Z directions, as well as angular rotation, also known as the goals, provided by the present nut plate designs are provided by a delicate interplay of relationships of the various components, variables within each component as well as relationships across the components. The disclosed relationships are more than mere optimization, maximization, or minimization of a single characteristic or variable, and are often contrary to conventional design thinking, yet have been found to achieve a unique balance of the trade-offs associated with competing criteria such as durability, vibration and fatigue resistance, weight, and ease of use. It is important to recognize that all the associated disclosure and relationships apply equally to all embodiments and should not be interpreted as being limited to the particular embodiment being discussed when a relationship is mentioned. Further, the aforementioned balances require trade-offs among the competing characteristics recognizing key points of diminishing returns, as often disclosed with respect to open and closed ranges for particular variables and relationships. Proper functioning of each component, and the overall nut plate, on each and every engagement can be a matter of life or death. Therefore, this disclosure contains a unique combination of components and relationships that produce reliable and uniform deformation, separation of components, and constrained freedom of movement of the components, that is adverse to fatigue and stress concentration failures, so that the nut plate properly engages the panel (P) and provides a secure, yet adjustable, interface to secure additional components that are not perfectly aligned. While the relationships of the various features and dimensions of a single component play an essential role in achieving the goals, the relationships of features across multiple components are just as critical, if not more critical, to achieving the goals.

One such goal is constrained movement of the main nut section (200) in the X direction whereby the separated, yet constrained, main nut section (200) may translate in the X direction, as seen in FIGS. 16 and 17, a X direction dimension, which in one embodiment is at least 2% of the NAPS bore diameter (347), seen in FIG. 4A, and at least 4% in another embodiment, and at least 6% in still a further embodiment. Further embodiments have identified upper limits on this constrained X direction translation beyond which the design, durability, and usability suffer. Therefore, in another embodiment the constrained X direction translation of the separated main nut section (200) is no more than 20% of the NAPS bore diameter (347), and no more than 15% in another embodiment, and no more than 10% in still a further embodiment. In one particular embodiment the constrained X direction translation of the separated main nut section (200) is at least 0.030", and at least 0.040", 0.050", and 0.060" in further embodiments. A further series of embodiments limits the constrained X direction translation of the separated main nut section (200) to no more than 0.200", and no more than 0.175", 0.150", 0.125", 0.100", and 0.075" in further embodiments.

Similarly, another such goal is constrained movement of the main nut section (200) in the Z direction whereby the separated, yet constrained, main nut section (200) may translate in the Z direction, as seen in FIG. 19, a Z direction dimension, which in one embodiment is at least 2% of the NAPS bore diameter (347), and at least 4% in another embodiment, and at least 6% in still a further embodiment. Further embodiments have identified upper limits on this constrained Z direction translation beyond which the design, durability, and usability suffer. Therefore, in another embodiment the constrained Z direction translation of the separated main nut section (200) is no more than 20% of the NAPS bore diameter (347), and no more than 15% in another embodiment, and no more than 10% in still a further embodiment. In one particular embodiment the constrained Z direction translation of the separated main nut section (200) is at least 0.030", and at least 0.040", 0.050", and 0.060" in further embodiments. A further series of embodiments limits the constrained Z direction translation of the separated main nut section (200) to no more than 0.200", and no more than 0.175", 0.150", 0.125", 0.100", and 0.075" in further embodiments. Now with the center of the NAPS bore (340) serving as an origin point in FIG. 19, with the positive X direction to the right, the negative X direction to the left, the positive Z direction upward, and the negative Z direction downward, thereby defining 4 quadrants, in another series of embodiments the disclosed constrained X and Z direction translation values are also achieved in at least one additional direction in at least one of the quadrants, and at least two of the quadrants in another embodiment, and at least three of the quadrants in still a further embodiment, and all four of the quadrants in yet another embodiment. In another series of embodiments the disclosed constrained X and Z direction translation values are also achieved throughout all 360 degrees from the origin point.

Further, another such goal is constrained movement of the main nut section (200) in the Y direction whereby the separated, yet constrained, main nut section (200) may translate in the Y direction, as seen in FIG. 17, a Y direction dimension, which in one embodiment is at least 2% of the NAPS bore length (346), seen in FIG. 4A, and at least 4% in another embodiment, and at least 6% in still a further embodiment. Further embodiments have identified upper limits on this constrained Y direction translation beyond which the design, durability, and usability suffer. Therefore, in another embodiment the constrained Y direction translation of the separated main nut section (200) is no more than 50% of the NAPS bore length (346), and no more than 40% in another embodiment, and no more than 30% in still a further embodiment. The predetermined Y direction translation ensures adequate engagement of the complimentary geometry of the rotation prevention interface, often illustrated as the engagement of the locking prongs (660) and the MNS flange nut locking prong receiving recess (229), while still accommodating misalignment of the MNS longitudinal axis of main nut section (200) with respect to the NAPS longitudinal axis of the nut axial protrusion section (300). In one particular embodiment the constrained Y direction translation is at least 0.005", and at least 0.0075", 0.010", and 0.0125" in further embodiments. A further series of embodiments limits the constrained Y direction translation of the separated main nut section (200) to no more than 0.100", and no more than 0.075", 0.050", 0.040", 0.035", and 0.030" in further embodiments. In another embodiment the constrained Y direction translation is less than at least one of the constrained X direction translation and the constrained Z direction translation. In a further embodiment the constrained Y direction translation is at least 15% less than at least one of the constrained X direction translation and the constrained Z direction translation, and at least 25% less, 30% less, and 35% less in additional embodiments. However, in another series of embodiments the constrained Y direction translation is at least 25% of at least one of the constrained X direction translation and the constrained Z direction translation, and at least 35%, 45%, and 55% in additional embodiments.

Additionally, still another such goal is constrained movement of the main nut section (200) in multiple directions whereby the separated, yet constrained, main nut section (200) may have its MNS longitudinal axis of main nut section (200) rotated a constrained predetermined angular rotation with respect to the NAPS longitudinal axis of the nut axial protrusion section (300), as seen in FIG. 20. In one embodiment the constrained predetermined angular rotation is at least 0.5 degrees, and at least 1.0, 2.0, 3.0, and 4.0 degrees in additional embodiments. Further embodiments have identified upper limits on this constrained predetermined angular rotation beyond which the design, durability, and usability suffer. Therefore, in another embodiment the constrained predetermined angular rotation is no more than 20 degrees, and no more than 15, 12.5, 10, and 7.5 degrees in additional embodiments.

Additionally, the relative length, width, thickness, geometry, and material properties of various components, and their relationships to one another and the other design variables disclosed herein, influence the durability, ease of use, security, and safety of the nut plate to achieve the goals. Now to put the disclosed ranges and relationships into perspective with an embodiment of the blind fastener directed to aerospace applications where size, weight, and durability are essential, in an embodiment any, or all of, the nut length (106), the MNS flange width (227), washer retaining rim outer width (618), and/or the washer outer width, is no more than 26 mm, and no more than 22 mm, 18 mm, 14 mm, and 10 mm in additional embodiments. In another embodiment the MNS length (206) is at least 25% of the nut length (106), and at least 45%, 55%, and 65%; however, in additional embodiments the MNS length (206) is no more than 75% of the nut length (106), and no more than 65% and 55% in further embodiments. Additionally, in an additional embodiment the MNS flange width (227) is at least 60% of the nut length (106), and at least 70%, 80%, 90%, and 100% in further embodiments; however, in additional embodiments the MNS flange width (227) is no more than 200% of the nut length (106), and no more than 175%, 150%, and 125% in further embodiments. In still another embodiment the nut frangible section length (406) is no more than 40% of the nut length (106), and no more than 30%, 20%, 15%, and 10% in additional embodiments; however, in further embodiments the nut frangible section length (406) is at least 2% of the nut length (106), and 4%, 6%, and 8% in additional embodiments. Additionally, in an embodiment the NAPS bore diameter (347) is at least 2% greater than the MNS bore width (237), and at least 4%, 6%, and 8% in additional embodiments; however, in further embodiments the NAPS bore diameter (347) is no more than 40% greater than the MNS bore width (237), and no more than 30%, 20%, and 15% in additional embodiments. Further, in another embodiment the NAPS threaded portion length (326) is at least 20% of the MNS bore length (236), and at least 25%, 30%, 35%, and 40% in additional embodiments; however, in further embodiments the NAPS threaded portion length (326) is no more than 80% of the MNS bore length (236), and no more than 70%, 60%, and 50% in additional embodiments. In still a further embodiment the tool engagement portion length (216) is at least 50% of the MNS flange length (226), and at least 60%, 70%, and 80% in additional embodiments; however, in further embodiments the tool engagement portion length (216) is no more than 200% of the MNS flange length (226), and no more than 175%, 150%, 125%, and 100% in additional embodiments. Additionally, in another embodiment the MNS bore length (236) is at least 70% of the NAPS length (306) and/or the NAPS bore length (346), and at least 90%, 100%, 110%, and 120% in additional embodiments; however, in further embodiments the MNS bore length (236) is no more than 200% of the NAPS length (306) and/or the NAPS bore length (346), and no more than 175%, 150%, and 125% in additional embodiments.

Relationships of the components of the cage (600) to those of the nut (100) also play a critical role in achieving the goals. For instance, in one embodiment the cage locking projection length (626) is no more than 150% of the sum of the tool engagement portion length (216) and the MNS flange length (226), and no more than 125% of the sum and 100% of the sum in additional embodiments; however, in further embodiments the cage locking projection length (626) is at least 50% of the sum of the tool engagement portion length (216) and the MNS flange length (226), and at least 65%, 80%, and 90% in additional embodiments. As previously disclosed, the maximum locking projection thickness is one half of the difference between the cage locking projection outer width (628) and the cage locking projection bore minimum width (648), as seen in FIG. 5. In an embodiment the maximum locking projection thickness is at least 20% greater than the NAPS section wall thickness (308), and at least 30%, 40%, and 50% greater in additional embodiments; however, in further embodiments the maximum locking projection thickness is no more than 300% of the NAPS section wall thickness (308), and no more than 275%, 250%, 225%, and 200% in additional embodiments. Still further, in another embodiment the projection gap (629) is at least 20% of the NAPS section wall thickness (308), and at least 30%, 40%, and 50% in additional embodiments; however, in further embodiments the projection gap (629) is no more than 300% of the NAPS section wall thickness (308), and no more than 275%, 250%, 225%, and 200% in additional embodiments.

Relationships of the components of the washer (500) to those of the cage (600) and/or the nut (100) also play a critical role in achieving the goals. For instance, in one embodiment the washer length (506) is at least 10% of the MNS flange length (226) and/or the tool engagement portion length (216), and at least 20%, 30%, and 40% in additional embodiments; however, in further embodiments the washer length (506) is no more than 100% of the MNS flange length (226) and/or the tool engagement portion length (216), and no more than 90%, 80%, 70%, and 60% in additional embodiments. Further, in another embodiment the washer length (506) is designed to change from an undeformed value to a deformed value occurring when the nut frangible section (400) gives way, and the change is at least 10% of the undeformed washer length (506), and at least 20%, 30%, and 40% in additional embodiments; however, in further embodiments the change is no more than 80% of the undeformed washer length (506), and no more than 70%, 60%, and 50% in additional embodiments. Likewise, in another embodiment the change of the washer length (506) from the undeformed value to the deformed value occurring when the nut frangible section (400) gives way is at least 10% of the MNS flange length (226) and/or the tool engagement portion length (216), and at least 20%, 30%, and 40% in additional embodiments; however, in further embodiments the change is no more than 80% of the the MNS flange length (226) and/or the tool engagement portion length (216), and no more than 70%, 60%, and 50% in additional embodiments. Similarly, in another embodiment either the recess height and/or depth of the receiving recess (229) is greater than embodiment the change of the washer length (506) from the undeformed value to the deformed value occurring when the nut frangible section (400) gives way.

The material properties of the various components of the rivetless nut plate are essential to the goals. In one embodiment the cage (600) is formed of a material different than at least one of the following: the nut (100), the main nut section (200), the MNS flange (220), the nut axial protrusion section (300), the nut frangible section (400), the washer (500), the washer retaining rim (610), the cage locking projection (620), the nut locking prong (660), and the nut locking entrapment strap (670); while in a further embodiment the cage (600) is formed of a material different than at least two of the listed components, and at least 3 in an even further embodiment. In a further embodiment at least two of the following components are formed of the same material: the nut (100), the main nut section (200), the MNS flange (220), the nut axial protrusion section (300), the nut frangible section (400), the washer (500), the washer retaining rim (610), the cage locking projection (620), the nut locking prong (660), and the nut locking entrapment strap (670); and in another embodiment at least three of the listed components are formed of the same material.

In one embodiment the cage (600) is non-metallic and is no more than 2.0 grams, and no more than 1.5 grams, and 0.5 grams in further embodiments; while in a further embodiment the nut (100) is also non-metallic and is no more than 2.0 grams, and no more than 1.5 grams, and no more than 0.5 grams in further embodiments; while in an even further embodiment the washer (500) is metallic yet is no more than the mass of the cage (600). In a further embodiment at least one of the nut (100) and the cage (600) are composed of, but not limited to, at least one of the following: an aluminum alloy, an anodized aluminum alloy, a copper containing alloy, a zinc alloy, a stainless steel alloy, a high carbon steel alloy, a carbon epoxy compound, or a glass epoxy compound. Additionally, in the embodiments that are composed of various metals a corrosion resisting coating may also be used such as, but not limited to: a cadmium coating, a chromate coating, a polymer coating or a combination thereof. Furthermore, in one embodiment the MNS bore threads (238), the NAPS threaded portion threads (332), and/or the cage locking projection threads (652) may have a lubricant to help facilitate ease of installing and activating the rivetless nut plate.

In still another embodiment at least one of the following components are formed of a nonmetallic material: the nut (100), the main nut section (200), the MNS flange (220), the nut axial protrusion section (300), the nut frangible section (400), the washer (500), the washer retaining rim (610), the cage locking projection (620), the nut locking prong (660) and the nut locking entrapment strap (670); and in another embodiment the nonmetallic material has a density of less than 2 g/cc and one, or more, of the following properties: a ASTM D638 tensile strength of at least 30 Ksi at 160° F., a ASTM D638 tensile modulus of at least 3500 Ksi at 160° F., a ASTM D695 compressive strength of at least 33 Ksi at 160° F., a ASTM D695 compression modulus of at least 1000 Ksi at 160° F., a ASTM D6272 flexural strength of at least 42 Ksi at 160° F., a ASTM D6272 flexural modulus of at least 2800 Ksi at 160° F., a ASTM D5379 shear strength of at least 11 Ksi at 160° F., and a ASTM D5961 bearing strength of at least 36 Ksi at 160° F. In a further embodiment the nonmetallic material has a density of less than 1.80 g/cc, and less than 1.60 g/cc, and less than 1.50 g/cc in additional embodiments. In another embodiment the nonmetallic material is a carbon fiber reinforced plastic material. In one embodiment desired strain relationships are achieved by having the nut (100) and or cage (600) formed of a polyamide resin, while in a further embodiment the polyamide resin includes fiber reinforcement, and in yet another embodiment the polyamide resin includes at least 35% fiber reinforcement. In one such embodiment the fiber reinforcement includes long-glass fibers having a length of at least 10 millimeters pre-molding and produce a finished nut (100) and or cage (600) having fiber lengths of at least 3 millimeters, while another embodiment includes fiber reinforcement having short-glass fibers with a length of at least 0.5-2.0 millimeters pre-molding. One embodiment includes 35-55% long fiber reinforcement, while in an even further embodiment has 40-50% long fiber reinforcement. One specific example is a long-glass fiber reinforced polyamide 66 compound with 40% carbon fiber reinforcement, such as the XuanWu XW5801 resin having a tensile strength of 245 megapascal and 7% elongation at break. Long fiber reinforced polyamides, and the resulting melt properties, produce a more isotropic material than that of short fiber reinforced polyamides, primarily due to the three-dimensional network formed by the long fibers developed during injection molding. Another advantage of long-fiber material is the almost linear behavior through to fracture resulting in less deformation at higher stresses.

In still another embodiment at least one of the following components are formed of a metallic material with a density of less than 4.6 g/cc in one embodiment, and less than 3 g/cc in another embodiment: the nut (100), the main nut section (200), the MNS flange (220), the nut axial protrusion section (300), the nut frangible section (400), the washer (500), the washer retaining rim (610), the cage locking projection (620), the nut locking prong (660) and the nut locking entrapment strap (670); and in another embodiment the material has one, or more, of the following properties: an ultimate tensile strength of at least 68 Ksi, and at least 80 Ksi in anther embodiment; a tensile yield strength of at least 47 Ksi, and at least 70 Ksi in another embodiment; an elongation to break of at least 9% in one embodiment, and at least 11% in another embodiment, and at least 13%, 15%, 17%, and 19% in still further embodiments; and/or a modulus of elasticity of at least 9000 Ksi in one embodiment, and at least 10000 Ksi in another embodiment.

In a particular series of aerospace embodiments balancing all the factors and relationships disclosed herein and placing more emphasis on strength, the nut (100), and the cage (600) are formed of the same material, which in one embodiment is A286 stainless steel; in another embodiment the washer (500) is a spring tempered 304 stainless steel. In another series of aerospace embodiments balancing all the factors and relationships disclosed herein and placing more emphasis on strength, the nut (100), and the cage (600) are formed of the same material, which in one embodiment is 301 stainless steel.

The nut (100) and/or cage (600) may include a helical thread insert, as disclosed in U.S. patent applications Ser. Nos. 15/595,620 and 15/906,549, which are hereby fully incorporated by reference.

Some examples of metal alloys that can be used to form any of the components of the rivetless nut plate include, without limitation, magnesium alloys, aluminum/aluminum alloys (e.g., 3000 series alloys, 5000 series alloys, 6000 series alloys, such as 6061-T6, and 7000 series alloys, such as 7075, just to name a few), titanium alloys (e.g., 3-2.5, 6-4, SP700, 15-3-3-3, 10-2-3, and other alpha/near alpha, alpha-beta, and beta/near beta titanium alloys, just to name a few), carbon steels (e.g., 1020 and 8620 carbon steel, just to name a few), stainless steels (e.g., A286, 301, 302, 303, 304 and 410 stainless steel), PH (precipitation-hardenable) alloys (e.g., 17-4, C450, and C455 alloys, just to name a few), copper alloys, and nickel alloys.

Another embodiment tunes the galvanic compatibility of the components of the blind fastener. Thus, in one embodiment there is no more than a 0.50 V difference in the "Anodic Index" between any two of the components that come in contact with one another, while in another embodiment there is no more than a 0.25 V difference in the "Anodic Index" between any two of the components that come in contact with one another, and in yet another embodiment there is no more than a 0.15 V difference in the "Anodic Index" between any two of the components that come in contact with one another; per the galvanic data from MIL-STD-889.

Numerous alterations, modifications, and variations of the embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitutes and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims.

I claim:

1. A rivetless nut plate for attachment to a panel (P) via a panel bore (PB), comprising:
   a nut (100), a washer (500), and a cage (600) that retains the nut (100) and washer (500);
   the nut (100) having a nut distal end (102), a nut proximal end (104), and a nut length (106) measured from the nut distal end (102) to the nut proximal end (104), wherein the nut (100) includes:
   (A) a main nut section (200) adjacent the nut proximal end (104) and having a MNS distal end (202), a MNS proximal end (204), a MNS length (206) measured from the MNS distal end (202) to the MNS proximal end (204), and a MNS wall thickness (208), wherein the main nut section (200) includes:
      (i) a tool engagement portion (210);
      (ii) a MNS flange (220);
      (iii) a MNS bore (230) extending from the MNS distal end (202) toward the MNS proximal end (204) and having a MNS bore distal end (232), a MNS bore proximal end (234), a MNS bore length (236) measure from the MNS bore distal end (232) to the MNS bore proximal end (234), a MNS bore width (237), and a plurality of MNS bore threads (238);
    (iv) a MNS rotation prevention interface;
  (B) a nut axial protrusion section (300) adjacent the nut distal end (102) and having a NAPS distal end (302), a NAPS proximal end (304), a NAPS length (306) measure from the NAPS distal end (302) to the NAPS proximal end (304), and a NAPS section wall thickness (308), wherein the nut axial protrusion section (300) includes:
    (i) a NAPS threaded portion (320) having a plurality of external NAPS threads (332) sized to create a NAPS threaded portion taper angle (330) of 0.5-15 degrees, a NAPS threaded portion distal end (322), a NAPS threaded portion proximal end (324), a NAPS threaded portion length (326) measure from the NAPS threaded portion distal end (322) to the NAPS threaded portion proximal end (324), a NAPS threaded portion minimum width (328), and a NAPS threaded portion maximum width (329);
    (ii) a NAPS bore (340) extending through the nut axial protrusion section (300) and having a NAPS bore distal end (342), a NAPS bore proximal end (344), a NAPS bore length (346) measured from the NAPS bore distal end (342) to the NAPS bore proximal end (344), and a NAPS bore diameter (347);
  (C) a nut flangible section (400) located between the main nut section (200) and the nut axial protrusion section (300), and having a NFS distal end (402), a NFS proximal end (404), a NFS length (406) measured from the NFS distal end (402) to the NFS proximal end (404), and a NFS wall thickness (408);
the washer (500) having a washer distal end (502), a washer proximal end (504), and a washer length (506) measure from the washer distal end (502) to the washer proximal end (504);
the cage (600) having a cage distal end (602) and a cage proximal end (604), wherein the cage (600) includes:
  (A) a cage radial flat interconnection (630) having a CRFI distal end (632), a CRFI proximal end (634), a CRFI length (636) measured from the CRFI distal end (632) to the CRFI proximal end (634), and a CRFI width (638);
  (B) a washer retaining rim (610) extending from the cage radial flat interconnection (630) toward the cage proximal end (604) and having a WRR distal end (612), a WRR proximal end (614), a WRR length (616) measured from the WRR distal end (612) to the WRR proximal end (614), a WRR inner width (617), and a WRR outer width (618);
  (C) a cage locking projection (620) extending from the cage radial flat interconnection (630) toward the cage distal end (602) and having a CLP distal end (622), a CLP proximal end (624), a CLP length (626) measured from the CLP distal end (622) to the CLP proximal end (624), and a CLP outer width (628), wherein the cage locking projection (620) includes:
    (i) a CLP bore (640) extending through the cage (600) and having a CLP distal end (642), a CLP proximal end (644), a CLP length (646) measured from the CLP distal end (642) to the CLP proximal end (644), a plurality of CLP threads (652) sized to create a CLP bore taper angle (650) of 0.5-15 degrees, a CLP bore minimum width (648), and a CLP bore maximum width (649);
  (D) at least one nut locking prong (660) extending away from the cage radial flat interconnection (630) and having a NLP distal end (662) and a NLP proximal end (664), wherein a portion of the at least one locking prong (660) entraps a portion of the main nut section (200) to prevent separation from the cage (600);
  (E) a cage rotation prevention interface;
wherein in a nonactivated state a portion of the plurality of external NAPS threads (332) engages a portion of the plurality of CLP threads (652), and a portion of the nut (100) is in contact with the washer (500), and upon further rotation of the nut (100), through a separation rotation angle of 45-540 degrees, additional engagement of the plurality of external NAPS threads (332) and the plurality of CLP threads (652) occurs thereby displacing the washer (500) and increasing the CLP outer width (628) until the nut frangible section (400) releases to achieve an activated state with the main nut section (200) separated from the nut axial protraction section (300) and the main nut section (200) constrained by the cage (600) and biased toward the cage proximal end (604) by the washer (500) to engage the MNS rotation prevention interface and the cage rotation prevention interface and thereby limit rotation of the main nut section (200) relative to the cage (600) to a constrained angular rotation range of no more than 20 degrees, wherein in the activated state the main nut section (200) is movable throughout a constrained degree of freedom including a constrained X-direction translation distance of 2-20% of the NAPS bore diameter (347), a constrained Y-direction translation distance of 2-50% of the NAPS bore length (346), a constrained Z-direction translation distance of 2-20% of the NAPS bore diameter (347), and a constrained tilt rotation range of 0.5-20 degrees with the constrained tilt rotation range being the angle between a MNS bore longitudinal axis of the MNS bore (230) from a NAPS bore longitudinal axis of the NAPS bore (340).

2. The rivetless nut plate of claim 1, wherein the separation rotation angle is 60-450 degrees, the constrained angular rotation range is at least 2.5 degrees, the NAPS threaded portion taper angle (330) is 1-10 degrees, the CLP bore taper angle (650) is 1-10 degrees, the constrained X-direction translation distance is 4-15% of the NAPS bore diameter (347), the constrained Y-direction translation distance is 4-40% of the NAPS bore length (346), the constrained Z-direction translation distance is 4-15% of the NAPS bore diameter (347), and the constrained tilt rotation range is 1-15 degrees.

3. The rivetless nut plate of claim 2, wherein the separation rotation angle is 75-360 degrees, the constrained angular rotation range is no more than 15 degrees, the NAPS threaded portion taper angle (330) is 1.5-7.5 degrees, the CLP bore taper angle (650) is 1.5-7.5 degrees, the constrained X-direction translation distance is 0.030"-0.200", the constrained Y-direction translation distance is 0.005"-0.100", the constrained Z-direction translation distance is 0.030"-0.200", and the constrained tilt rotation range is no more than 7.5 degrees.

4. The rivetless nut plate of claim 3, wherein the separation rotation angle is 90-300 degrees, the constrained angular rotation range is no more than 12.5 degrees, the NAPS threaded portion taper angle (330) is no more than 5 degrees, the CLP bore taper angle (650) is no more than 5 degrees, the constrained X-direction translation distance is no more than 0.150", the constrained Y-direction translation distance is no more than 0.050", and the constrained Z-direction translation distance is no more than 0.15".

5. The rivetless nut plate of claim 1, wherein the MNS rotation prevention interface includes at least one MNS flange nut locking prong receiving recess (229), the cage rotation prevention interface includes the at least one locking prong (660).

6. The rivetless nut plate of claim 5, wherein the at least one MNS flange nut locking prong receiving recess (229) includes at least two MNS flange nut locking prong receiving recesses (229) located 180 degrees apart, and the at least one locking prong (660) includes at least two locking prongs (660) located at least 180 degrees apart.

7. The rivetless nut plate of claim 5, wherein the at least one MNS flange nut locking prong receiving recess (229) is formed in the MNS flange (220).

8. The rivetless nut plate of claim 6, wherein the MNS flange (220) includes a MNS flange tapered region (228), and the at least one MNS flange nut locking prong receiving recess (229) is formed in the MNS flange tapered region (228).

9. The rivetless nut plate of claim 5, wherein at least two sidewalls of the at least one nut locking prong (660) taper toward one another.

10. The rivetless nut plate of claim 1, wherein the cage locking projection (620) includes at least two cage locking projections (620) separated by a projection gap (629) that is at least 50% of a maximum locking projection thickness.

11. The rivetless nut plate of claim 10, wherein the cage locking projection (620) includes at least four cage locking projections (620) separated by projection gaps (629), and the sum of the projection gaps (629) is no more than 180 degrees of a perimeter of the cage locking projection (620).

12. The rivetless nut plate of claim 1, wherein the MNS bore width (237) is 30-90% of the MNS bore length (236), and the NAPS bore length (346) is 50 to 100 percent of the MNS bore length (236).

13. The rivetless nut plate of claim 12, wherein the nut length (106) is no more than 26 mm, the MNS length (206) is 25%-75% of the nut length (106), the NAPS bore diameter (347) is 2%-40% greater than the MNS bore width (237), the MNS bore length (236) is 70%-200% of the NAPS length (306), and the cage (600) is formed of a material different than at least one of the nut (100) and the washer (500).

14. The rivetless nut plate of claim 13, wherein the cage (600) is non-metallic and has a mass of no more than 2.0 grams.

15. The rivetless nut plate of claim 1, wherein the cage locking projection (620) includes at least two cage locking projections (620) separated by a projection gap (629) that is at least 50% of a maximum locking projection thickness, the MNS bore width (237) is 30-90% of the MNS bore length (236), the NAPS bore length (346) is 50 to 100 percent of the MNS bore length (236), the nut length (106) is no more than 26 mm, the MNS length (206) is 25%-75% of the nut length (106), the NAPS bore diameter (347) is 2%-40% greater than the MNS bore width (237), the MNS bore length (236) is 70%-200% of the NAPS length (306), and the cage (600) is formed of a material different than at least one of the nut (100) and the washer (500).

16. A rivetless nut plate for attachment to a panel (P) via a panel bore (PB), comprising:

a nut (100), a washer (500), and a cage (600) that retains the nut (100) and washer (500);
the nut (100) having a nut distal end (102), a nut proximal end (104), and a nut length (106) measured from the nut distal end (102) to the nut proximal end (104), wherein the nut (100) includes:
 (A) a main nut section (200) adjacent the nut proximal end (104) and having a MNS distal end (202), a MNS proximal end (204), a MNS length (206) measured from the MNS distal end (202) to the MNS proximal end (204), and a MNS wall thickness (208), wherein the main nut section (200) includes:
  (i) a tool engagement portion (210);
  (ii) a MNS flange (220);
  (iii) a MNS bore (230) extending from the MNS distal end (202) toward the MNS proximal end (204) and having a MNS bore distal end (232), a MNS bore proximal end (234), a MNS bore length (236) measure from the MNS bore distal end (232) to the MNS bore proximal end (234), a MNS bore width (237), and a plurality of MNS bore threads (238);
  (iv) a MNS rotation prevention interface including at least one MNS flange nut locking prong receiving recess (229);
 (B) a nut axial protrusion section (300) adjacent the nut distal end (102) and having a NAPS distal end (302), a NAPS proximal end (304), a NAPS length (306) measure from the NAPS distal end (302) to the NAPS proximal end (304), and a NAPS section wall thickness (308), wherein the nut axial protrusion section (300) includes:
  (i) a NAPS threaded portion (320) having a plurality of external NAPS threads (332) sized to create a NAPS threaded portion taper angle (330) of 0.5-15 degrees, a NAPS threaded portion distal end (322), a NAPS threaded portion proximal end (324), a NAPS threaded portion length (326) measure from the NAPS threaded portion distal end (322) to the NAPS threaded portion proximal end (324), a NAPS threaded portion minimum width (328), and a NAPS threaded portion maximum width (329);
  (ii) a NAPS bore (340) extending through the nut axial protrusion section (300) and having a NAPS bore distal end (342), a NAPS bore proximal end (344), a NAPS bore length (346) measured from the NAPS bore distal end (342) to the NAPS bore proximal end (344), and a NAPS bore diameter (347);
 (C) a nut flangible section (400) located between the main nut section (200) and the nut axial protrusion section (300), and having a NFS distal end (402), a NFS proximal end (404), a NFS length (406) measured from the NFS distal end (402) to the NFS proximal end (404), and a NFS wall thickness (408);
the washer (500) having a washer distal end (502), a washer proximal end (504), and a washer length (506) measure from the washer distal end (502) to the washer proximal end (504);
the cage (600) having a cage distal end (602) and a cage proximal end (604), wherein the cage (600) includes:
 (A) a cage radial flat interconnection (630) having a CRFI distal end (632), a CRFI proximal end (634), a CRFI length (636) measured from the CRFI distal end (632) to the CRFI proximal end (634), and a CRFI width (638);

(B) a washer retaining rim (610) extending from the cage radial flat interconnection (630) toward the cage proximal end (604) and having a WRR distal end (612), a WRR proximal end (614), a WRR length (616) measured from the WRR distal end (612) to the WRR proximal end (614), a WRR inner width (617), and a WRR outer width (618);

(C) a cage locking projection (620) extending from the cage radial flat interconnection (630) toward the cage distal end (602) and having a CLP distal end (622), a CLP proximal end (624), a CLP length (626) measured from the CLP distal end (622) to the CLP proximal end (624), and a CLP outer width (628), wherein the cage locking projection (620) includes:
  (i) a CLP bore (640) extending through the cage (600) and having a CLP distal end (642), a CLP proximal end (644), a CLP length (646) measured from the CLP distal end (642) to the CLP proximal end (644), a plurality of CLP threads (652) sized to create a CLP bore taper angle (650) of 0.5-15 degrees, a CLP bore minimum width (648), and a CLP bore maximum width (649);

(D) at least one nut locking prong (660) extending away from the cage radial flat interconnection (630) and having a NLP distal end (662) and a NLP proximal end (664), wherein a portion of the at least one locking prong (660) entraps a portion of the main nut section (200) to prevent separation from the cage (600);

(E) a cage rotation prevention interface;
wherein in a nonactivated state a portion of the plurality of external NAPS threads (332) engages a portion of the plurality of CLP threads (652), and a portion of the nut (100) is in contact with the washer (500), and upon further rotation of the nut (100), through a separation rotation angle of 45-540 degrees, additional engagement of the plurality of external NAPS threads (332) and the plurality of CLP threads (652) occurs thereby displacing the washer (500) and increasing the CLP outer width (628) until the nut frangible section (400) releases to achieve an activated state with the main nut section (200) separated from the nut axial protraction section (300) and the main nut section (200) constrained by the cage (600) and biased toward the cage proximal end (604) by the washer (500) to engage the at least one MNS flange nut locking prong receiving recess (229) and at least one nut locking prong (660) and thereby limit rotation of the main nut section (200) relative to the cage (600) to a constrained angular rotation range of no more than 20 degrees, wherein in the activated state the main nut section (200) is movable throughout a constrained degree of freedom including a constrained X-direction translation distance of 2-20% of the NAPS bore diameter (347), a constrained Y-direction translation distance of 2-50% of the NAPS bore length (346), a constrained Z-direction translation distance of 2-20% of the NAPS bore diameter (347), and a constrained tilt rotation range of 0.5-20 degrees with the constrained tilt rotation range being the angle between a MNS bore longitudinal axis of the MNS bore (230) from a NAPS bore longitudinal axis of the NAPS bore (340).

17. The rivetless nut plate of claim 16, wherein the separation rotation angle is 60-450 degrees, the constrained angular rotation range is at least 2.5 degrees, the NAPS threaded portion taper angle (330) is 1-10 degrees, the CLP bore taper angle (650) is 1-10 degrees, the constrained X-direction translation distance is 4-15% of the NAPS bore diameter (347), the constrained Y-direction translation distance is 4-40% of the NAPS bore length (346), the constrained Z-direction translation distance is 4-15% of the NAPS bore diameter (347), and the constrained tilt rotation range is 1-15 degrees.

18. The rivetless nut plate of claim 17, wherein the separation rotation angle is 75-360 degrees, the constrained angular rotation range is no more than 15 degrees, the NAPS threaded portion taper angle (330) is 1.5-7.5 degrees, the CLP bore taper angle (650) is 1.5-7.5 degrees, the constrained X-direction translation distance is 0.030"-0.200", the constrained Y-direction translation distance is 0.005"-0.100", the constrained Z-direction translation distance is 0.030"-0.200", and the constrained tilt rotation range is no more than 7.5 degrees.

19. The rivetless nut plate of claim 18, wherein the separation rotation angle is 90-300 degrees, the constrained angular rotation range is no more than 12.5 degrees, the NAPS threaded portion taper angle (330) is no more than 5 degrees, the CLP bore taper angle (650) is no more than 5 degrees, the constrained X-direction translation distance is no more than 0.150", the constrained Y-direction translation distance is no more than 0.050", and the constrained Z-direction translation distance is no more than 0.15".

20. The rivetless nut plate of claim 16, wherein the at least one MNS flange nut locking prong receiving recess (229) includes at least two MNS flange nut locking prong receiving recesses (229) located 180 degrees apart, and the at least one locking prong (660) includes at least two locking prongs (660) located at least 180 degrees apart.

* * * * *